(12) United States Patent
Jung et al.

(10) Patent No.: US 11,689,997 B2
(45) Date of Patent: Jun. 27, 2023

(54) APPARATUS AND METHOD FOR FREQUENCY SCANNING IN WIRELESS COMMUNICATION SYSTEM

(71) Applicant: Samsung Electronics Co., Ltd., Suwon-si (KR)

(72) Inventors: Doyoung Jung, Suwon-si (KR); Sangkyou Ryou, Suwon-si (KR); Ingil Baek, Suwon-si (KR); Junhee Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 105 days.

(21) Appl. No.: 17/315,515

(22) Filed: May 10, 2021

(65) Prior Publication Data

US 2021/0266826 A1    Aug. 26, 2021

Related U.S. Application Data

(63) Continuation of application No. 17/007,471, filed on Aug. 31, 2020, now Pat. No. 11,006,354, which is a
(Continued)

(30) Foreign Application Priority Data

Jul. 5, 2018  (KR) ........................ 10-2018-0078203

(51) Int. Cl.
*H04W 48/16*    (2009.01)
*H04W 76/27*    (2018.01)
*H04W 24/10*    (2009.01)

(52) U.S. Cl.
CPC ........... *H04W 48/16* (2013.01); *H04W 24/10* (2013.01); *H04W 76/27* (2018.02)

(58) Field of Classification Search
CPC ...... H04W 16/28; H04W 64/00; H04W 16/24
See application file for complete search history.

(56) References Cited

U.S. PATENT DOCUMENTS 7,821,997 B2   10/2010   Talmola et al.
8,045,981 B2   10/2011   Umatt et al.
(Continued)

FOREIGN PATENT DOCUMENTS

CN   105493547 A    4/2016
EP   2 552 144 A1   1/2013
(Continued)

OTHER PUBLICATIONS

International Search Report and Written Opinion dated May 3, 2019, issued in a counterpart an International application No. PCT/KR2019/001470.
(Continued)

*Primary Examiner* — Sam Bhattacharya
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as long term evolution (LTE). An apparatus of a terminal in a wireless communication system is provided. The apparatus includes at least one transceiver and at least one processor operably coupled to the at least one transceiver. The at least one processor performs a frequency scanning through a first beam set, identifies at least one cell based on the frequency scanning, and communicates with the at least one identified cell through a second beam set.

20 Claims, 16 Drawing Sheets

Related U.S. Application Data continuation of application No. 16/265,175, filed on Feb. 1, 2019, now Pat. No. 10,764,818.

(60) Provisional application No. 62/626,876, filed on Feb. 6, 2018.

(56) References Cited

U.S. PATENT DOCUMENTS

| | | |
|---|---|---|
| 2007/0072582 A1 | 3/2007 | Nurmi |
| 2012/0196591 A1 | 8/2012 | O'Keeffe et al. |
| 2013/0237218 A1 | 9/2013 | Li et al. |
| 2014/0098912 A1 | 4/2014 | Yin et al. |
| 2017/0164211 A1 | 6/2017 | Ho et al. |
| 2017/0303262 A1 | 10/2017 | Yuan et al. |
| 2018/0049154 A1 | 2/2018 | Choi et al. |
| 2018/0213516 A1 | 7/2018 | Kim et al. |

FOREIGN PATENT DOCUMENTS

| | | |
|---|---|---|
| EP | 3 217 737 A1 | 9/2017 |
| WO | 2016/027937 A1 | 2/2016 |
| WO | 2016/129744 A1 | 8/2016 |

OTHER PUBLICATIONS

Mediatek Inc., Discussion on cell detection requirement for NR, 3GPP TSG-RAN WG4 AH 1801 Meeting, R4-1800114, San Diego, CA, USA, Jan. 15, 2018.

European Search Report dated Nov. 24, 2020, issued in European Application No. 19750781.7.

Indian Office Action dated Jul. 15, 2022, issued in Indian Patent Application No. 202017037444.

National Instruments, Discussion on Robust Beam Management, 3GPP TSG RAN WG1 Meeting #89 R1-1708271, Hangzhou, P.R. China, May 15-19, 2017.

Nokia, Alcatel-Lucent Shanghai Bell, SRS transmission for beam management, 3GPP TSG RAN WG1 NR Ad-Hoc#2 R1-1711290, Qingdao, P.R. China, Jun. 27-30, 2017.

Notice of Patent Grant dated Oct. 31, 2022, issued in Korean Application No. 10-2018-0078203.

Chinese Office Action dated Nov. 24, 2022, issued in Chinese Application No. 201980008438.5.

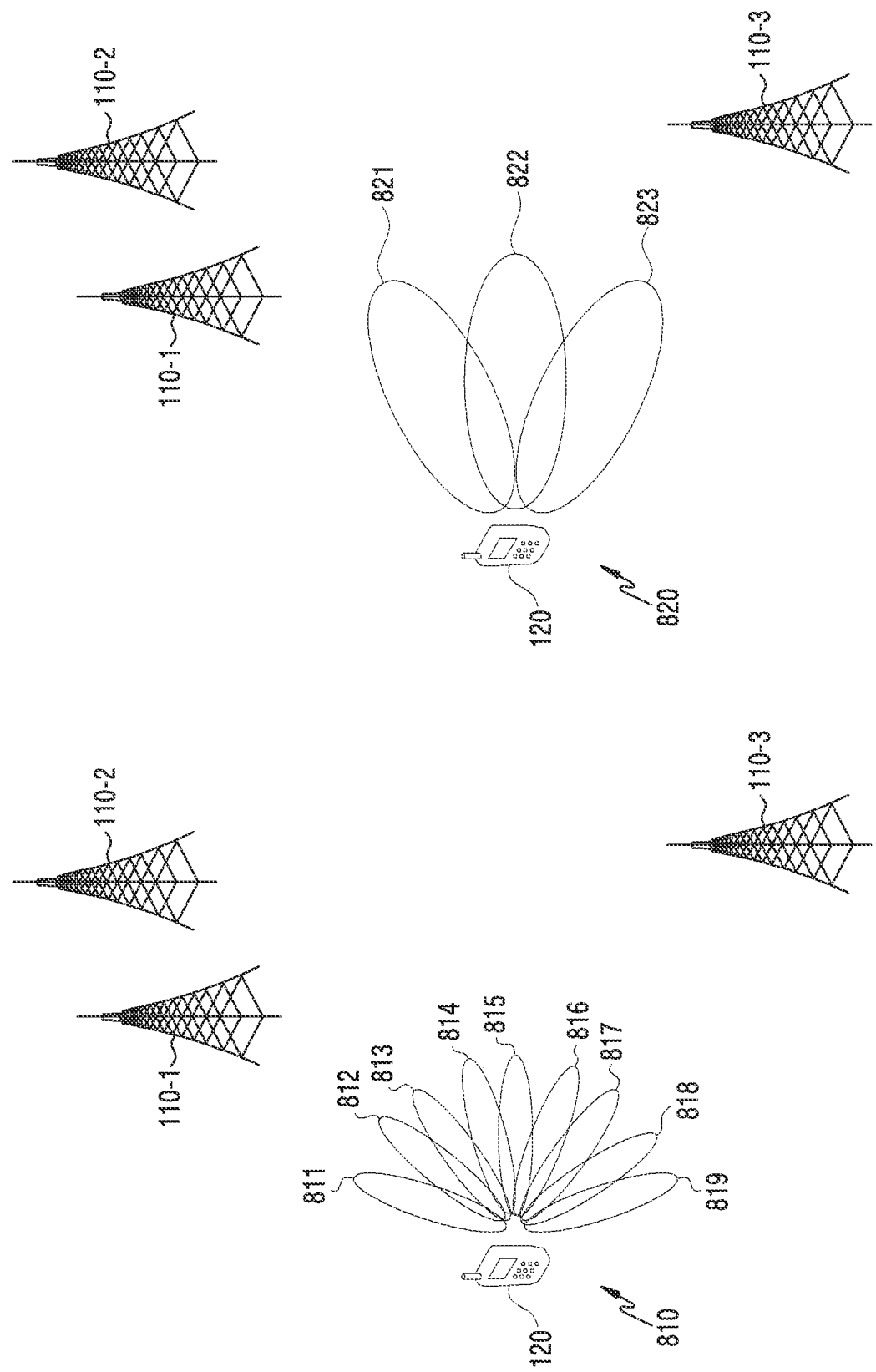

ized Korean patent application number 10-2018-0078203, filed on Jul. 5, 2018, in the Korean Intellectual Property Office, the disclosure of each of which is incorporated by reference herein in its entirety.

APPARATUS AND METHOD FOR FREQUENCY SCANNING IN WIRELESS COMMUNICATION SYSTEM

CROSS-REFERENCE TO RELATED APPLICATION(S)

This application is a continuation application of prior application Ser. No. 17/007,471, filed on Aug. 31, 2020, which will be issued as U.S. Pat. No. 11,006,354 on May 11, 2021; which is a continuation application of prior application Ser. No. 16/265,175, filed on Feb. 1, 2019, which has issued as U.S. Pat. No. 10,764,818 on Sep. 1, 2020; which was based on and claimed priority under 35 U.S.C § 119(e) of a U.S. Provisional application Ser. No. 62/626,876, filed on Feb. 6, 2018, in the U.S. Patent and Trademark Office, and under 35 U.S.C. § 119(a) of a Korean patent application number 10-2018-0078203, filed on Jul. 5, 2018, in the Korean Intellectual Property Office, the disclosure of each of which is incorporated by reference herein in its entirety.

BACKGROUND

1. Field

The disclosure relates to a wireless communication system. More particularly, the disclosure relates to an apparatus and a method for frequency scanning in a wireless communication system.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like.

In the 5G system, Hybrid frequency shift keying (FSK) and frequency and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

5G communication systems operate to increase a signal gain through a beamforming scheme in order to overcome a path loss problem due to characteristics of a super-high frequency band (for example, mmWave). Meanwhile, a terminal is required to preliminarily perform frequency scanning to access a base station (BS). In a beamforming communication system, the time required for a terminal to perform frequency scanning to access the BS may increase as gain control for each beam is performed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for performing frequency scanning in a wireless communication system.

Another aspect of the disclosure is to provide an apparatus and a method for performing beam-based frequency scanning in a wireless communication system.

Another aspect of the disclosure is to provide an apparatus and a method for performing frequency scanning through automatic gain control for each beam in a wireless communication system.

Another aspect of the disclosure is to provide an apparatus and a method for acquiring beam-based synchronization in a wireless communication system.

Another aspect of the disclosure is to provide an apparatus and a method for acquiring beam-based system information in a wireless communication system.

Another aspect of the disclosure is to provide an apparatus and a method for efficiently camping on a cell in a wireless communication system.

Another aspect of the disclosure is to provide an apparatus and a method for reducing time spent on frequency scanning in a wireless communication system.

Another aspect of the disclosure is to provide an apparatus and a method for effectively identifying a cell for frequency scanning in a wireless communication system.

Another aspect of the disclosure is to provide an apparatus and a method for identifying a cell through more accurate frequency scanning in a wireless communication system.

Another aspect of the disclosure is to provide an apparatus and a method for performing frequency scanning for carrier aggregation (CA) in a wireless communication system.

Additional aspects will be set forth in part in the description which follows and, in part, will be apparent from the description, or may be learned by practice of the presented embodiments.

In accordance with an aspect of the disclosure, an apparatus of a terminal in a wireless communication system is provided. The apparatus includes at least one transceiver and at least one processor operably coupled to the at least one transceiver. The at least one processor of the apparatus performs frequency scanning through a first beam set, identifies at least one cell based on the frequency scanning, and communicates with the at least one identified cell through a second beam set.

In accordance with another aspect of the disclosure, a method for operating a terminal in a wireless communication system is provided. The method includes performing frequency scanning through a first beam set, identifying at least one cell based on the frequency scanning, and communicating with the at least one identified cell through a second beam set.

An apparatus and a method according to various embodiments of the disclosure can efficiently perform frequency scanning by establishing beams or channels for frequency scanning.

Effects which can be acquired by the disclosure are not limited to the above described effects, and other effects that have not been mentioned may be clearly understood by those skilled in the art from the following description.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8A illustrates an example of a configuration of scan beams of a terminal in a wireless communication system according to an embodiment of the disclosure;

Throughout the drawings, it should be noted that like reference numbers are used to depict the same or similar elements, features, and structures.

DETAILED DESCRIPTION

Figure 1:
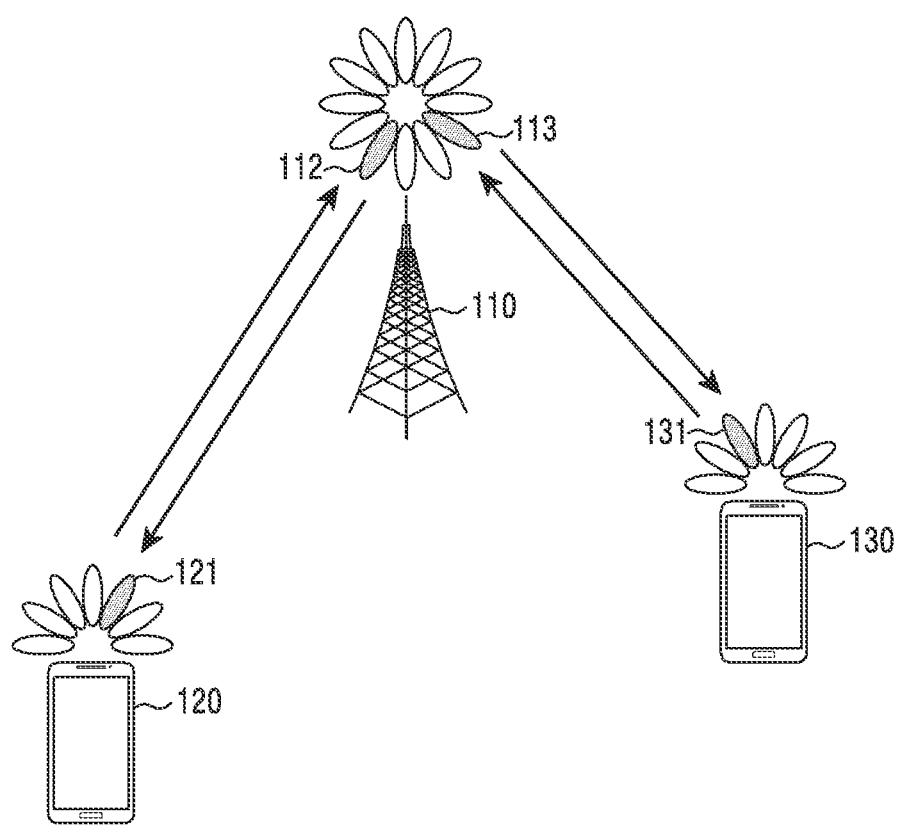
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on hardware technology. However, various embodiments of the disclosure include a technology that uses a combination of both hardware and software and thus, the various embodiments of the disclosure may not exclude the perspective of software.

Hereinafter, the disclosure relates to an apparatus and a method for performing frequency scanning scan beams in a wireless communication system. Specifically, the disclosure describes a technology for reducing time spent on frequency scanning when performing frequency scanning using a plurality of beams in a wireless communication system. Further, the disclosure describes a procedure for more accurately searching for a cell through selective and repetitive frequency scanning.

Terms referring or related to frequency scanning (for example, frequency scanning, frequency scan, or initial cell search), terms referring to a synchronization signal (for example, a primary synchronization signal (PSS), a secondary synchronization signal (SSS), or a synchronization signal (SS) block), terms referring or related to system information (for example, a physical broadcast channel (PBCH), an enhanced PBCH (ePBCH), an xPBCH, a master information block (MIB), a system information block (SIB), and an xSIB), terms referring to a signal (for example, a channel, a block, or a transmission instance), terms referring to a beam, terms related to resources (for example, a symbol, a slot, a half frame, or a frame), terms referring to network entities, and terms referring to an element of a device, used in the following description are examples for convenience of description. Accordingly, the disclosure is not limited to the following terms and other terms having the same technical meaning may be used.

Further, the disclosure describes various embodiments using the terms used in some communication standards (for example, 3rd Generation Partnership Project (3GPP)), but this is only an example. Various embodiments of the disclosure may be easily modified and applied to other communication systems.

FIG. 1 illustrates a wireless communication system according to an embodiment of the disclosure.

Referring to FIG. 1, a base station (BS) 110, a terminal 120, and a terminal 130 are illustrated as parts of nodes using a wireless channel in a wireless communication system.

The BS 110 is a network infrastructure element that provides wireless access to the terminals 120 and 130. The BS 110 has coverage defined for a predetermined geographical region based on the distance at which a signal can be transmitted. The BS 110 may be referred to as an "access point (AP)", an "evolved NodeB (eNB)", a "Next Generation NodeB (gNB)", a "5th-Generation (5G) node", a "wireless point", or another term having a technical meaning equivalent thereto, as well as "base station". According to various embodiments, the BS 110 may be connected to one or more "transmission/reception points (TRPs). The BS 110 may transmit a downlink signal to the terminal 120 or the terminal 130 or receive an uplink signal through one or more TRPs.

Each of the terminals 120 and 130 is a device used by a user, and performs communication with the BS 110 through a wireless channel. In some embodiments, at least one of the terminals 120 and 130 may operate without user involvement. That is, at least one of the terminals 120 and 130 may be a device that performs machine-type communication (MTC), and may not rely on direct user interaction. Each of the terminal 120 and the terminal 130 may be referred to as "user equipment (UE)", "mobile station", "subscriber station", "customer premises equipment (CPE)", "remote terminal", "wireless terminal", "electronic device", "user device", or other terms having the equivalent technical meaning, as well as "terminal".

The BS 110, the terminal 120, and the terminal 130 may transmit and receive wireless signals in millimeter-wave (mmWave) bands (for example, 28 GHz, 30 GHz, 38 GHz, and 60 GHz). At this time, in order to increase a channel gain, the BS 110, the terminal 120, and the terminal 130 may communicate using beamforming techniques. The beamforming techniques may include transmission beamforming and reception beamforming That is, the BS 110, the terminal 120, and the terminal 130 may assign directivity to a transmission signal and a reception signal. In an embodiment, the BS 110 and the terminals 120 and 130 may select serving beams 112, 113, 121, and 131 through a beam search procedure or beam management procedure. After the serving beams 112, 113, 121, and 131 are selected, communication may be performed through resources having a quasi-co-located (QCL) relationship with resources through which the serving beams 112, 113, 121, and 131 are transmitted.

When the large-scale characteristics of a channel for transmitting symbols on a first antenna port can be inferred from a channel for transmitting symbols on a second antenna port, the first antenna port and the second antenna port may be evaluated to have a QCL relationship therebetween. For example, the large-scale characteristics may include at least one of delay spread, Doppler spread, Doppler shift, average gain, average delay, and spatial receiver parameters.

The terminal 120 is required to acquire a channel list (or a frequency list) including a cell in order to access the cell. The cell is associated with coverage for each frequency supported by the eNB. The terminal 120 may perform frequency scanning in order to determine the presence of the cell. The terminal 120 may receive a signal. For example, the terminal 120 may receive a signal from the BS 110. The terminal 120 may receive a signal through reception beams of the terminal 120 (for example, serving beam 121). That is, the terminal 120 may perform frequency scanning through reception beams associated with the terminal 120. At this time, when the terminal 120 performs frequency scanning for all channels through all reception beams supported by the terminal 120, the number of determinations of whether there is the cell on the channel increases in proportion to the number of beams or channels. According the increase in the number of times for determining the presence of the cell, access of the terminal to the network may be delayed. Accordingly, the disclosure provides a method of configuring channels or beams for frequency scanning by the terminal 120 in a beamforming communication system.

Figure 2:
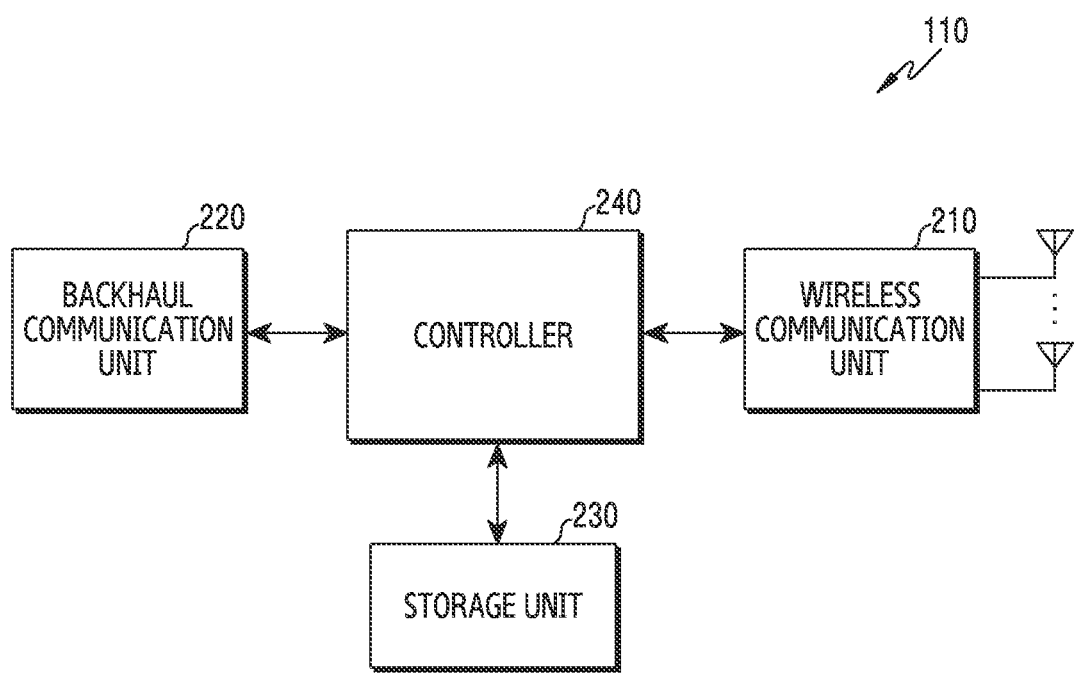
FIG. 2 illustrates an example of the configuration of a base station (BS) in a wireless communication system according to an embodiment of the disclosure.

FIG. 2 illustrates the configuration of a BS in a wireless communication system according to an embodiment of the disclosure. The configuration illustrated in FIG. 2 may be understood as the configuration of the BS 110. A term including "unit" or the ending of a word, such as "-or", "-er", or the like may indicate a unit of processing at least one function or operation. Any function or operation disclosed herein may be embodied by hardware, software, or a combination of hardware and software.

Referring to FIG. 2, the BS 110 may include a wireless communication unit 210, a backhaul communication unit 220, a storage unit 230, and a controller 240.

The wireless communication unit 210 may perform functions for transmitting and receiving signals through a wireless channel. In an embodiment, the wireless communication unit 210 may perform a function of conversion between a baseband signal and a bit stream according to a physical layer standard of the wireless communication system. For example, in data transmission, the wireless communication unit 210 may generate complex symbols by encoding and modulating a transmission bitstream. Also, in data reception, the wireless communication unit 210 may restore a reception bitstream by demodulating and decoding a baseband signal. The wireless communication unit 210 may up-convert a baseband signal into a radio-frequency (RF) band signal and transmit the same through an antenna as well as down-convert an RF band signal received through an antenna into a baseband signal.

In some embodiments, the wireless communication unit 210 may include a transmission filter, a reception filter, an amplifier, a mixer, an oscillator, a digital-to-analog convertor (DAC), an analog-to-digital convertor (ADC), and the like. Further, the wireless communication unit 210 may include one or more elements configured to establish a plurality of transmission/reception paths. In addition, the wireless communication unit 210 may include at least one antenna array consisting of a plurality of antenna elements. When implemented using hardware techniques, the wireless communication unit 210 may include a digital unit and an analog unit, and the analog unit may include a plurality of sub-units according to operation power, operation frequency, and the like.

The wireless communication unit 210 may transmit and receive a signal. For example, the wireless communication unit 210 may transmit a synchronization signal, a reference signal, system information, a message, control information, or data. The wireless communication unit 210 may transmit or receive a signal using beamforming techniques. In some embodiments, the wireless communication unit 210 may apply a beamforming weighted value to a signal in order to assign directivity to the signal to be transmitted and received according to settings of the controller 240.

The wireless communication unit 210 may transmit or receive a signal as described above. Accordingly, some or all of the elements associated with the wireless communication unit 210 may be referred to as a "transmitter", a "receiver", or a "transceiver". Also, the transmission and reception performed through a wireless channel, which is described in the following descriptions, may be understood to mean that the above-described processing may be performed by the wireless communication unit 210.

The backhaul communication unit 220 may provide an interface for performing communication with other nodes within the network. In an embodiment, the backhaul communication unit 220 may convert bitstreams transmitted to another node, for example, another access node, another BS, a higher node, or a core network, from the BS 110 into a physical signal and convert the physical signal received from the other node into bitstreams.

The storage unit 230 may store a basic program, an application, and/or data, such as setting information, associated with the operation of the BS 110. The storage unit 230 may be configured as volatile memory, non-volatile memory, or a combination of volatile memory and non-volatile memory. Further, the storage unit 230 may provide stored data in response to a request from the controller 240.

The controller 240 may control the general operation of the BS 110. For example, the controller 240 may instruct the wireless communication unit 210 or the backhaul communication unit 220 to transmit or receive a signal. Further, the controller 240 may record data in the storage unit 230 and retrieve or read the recorded data. The controller 240 may perform the functions of a required protocol stack according to communication standards. In an embodiment, the controller 240 may include at least one processor. According to various embodiments, the controller 240 may control the BS 110 to perform operations according to various embodiments described below.

Figure 3:
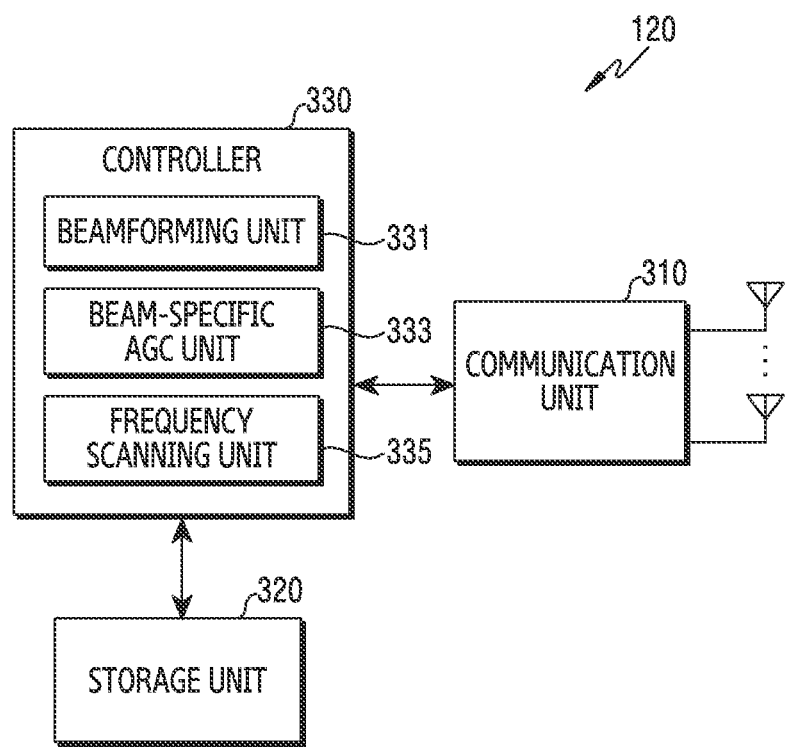
FIG. 3 illustrates an example of the configuration of a BS in a wireless communication system according to an embodiment of the disclosure.

FIG. 3 illustrates the configuration of the terminal in a wireless communication system according to an embodiment of the disclosure. The configuration illustrated in FIG. 3 may be understood as the configuration of the terminal 120. The term "unit" or the ending of a word, such as "-or", "-er", or the like may indicate a unit or element for processing at least one function or operation, and this may be embodied by hardware, software, or a combination of hardware and software.

Referring to FIG. 3, the terminal 120 includes a communication unit 310, a storage unit 320, and a controller 330.

The communication unit 310 may perform functions for transmitting/receiving a signal through a wireless channel. In an embodiment, the communication unit 310 may perform a function of converting a baseband signal to/from a bit stream according to a physical layer standard of the system. For example, when data is transmitted, the communication unit 310 may generate complex symbols by encoding and modulating a transmission bit stream. Also, in data reception, the communication unit 310 may restore a reception bitstream by demodulating and decoding a baseband signal. Also, the communication unit 310 may up-convert a baseband signal into a RF band signal and transmit the same through an antenna, and down-convert an RF band signal received through an antenna into a baseband signal. In some embodiments, the communication unit 310 may include a transmission filter, a reception filter, an amplifier, a mixer, an oscillator, a DAC, an ADC, and the like.

Further, the communication unit 310 may include one or more elements configured to establish a plurality of transmission/reception paths. For example, the communication unit 310 may include an antenna unit. In an embodiment, the communication unit 310 may include at least one antenna array consisting of a plurality of antenna elements. When implemented using hardware, the communication unit 310 may include a digital circuit and an analog circuit (for example, a radio frequency integrated circuit (RFIC)). The digital circuit and the analog circuit may be implemented as one package. The communication unit 310 may include a plurality of radio frequency (RF) chains. The communication unit 310 may be configured to perform beamforming techniques. For example, the communication unit 310 may apply a beamforming weighted value to a signal in order to assign directivity to the signal to be transmitted and received according to settings of the controller 330. According to an embodiment, the communication unit 310 may include a RF block (or an RF unit). The RF block may include a first RF circuit related to an antenna and a second RF circuit related to baseband processing. The first RF circuit may be referred to as an RF-Antenna (RF-A). The second RF circuit may be referred to as an RF-Baseband (RF-B).

The communication unit 310 may transmit and receive a signal. The communication unit 310 may receive a downlink signal. The downlink signal may include a SS, a reference signal (RS) (for example, a cell-specific reference signal (CRS), a demodulation (DM)-RS), system information (for example, a MIB, an SIB, remaining system information (RMSI), and other system information (OSI)), a configuration message, control information, downlink data, or the like. The communication unit 310 may transmit an uplink signal. The uplink signal may include a random access-related signal (for example, a random access preamble (RAP) (or Message 1 (Msg1), Message 3 (Msg3)), or a reference signal (for example, a sounding reference signal (SRS) or a DM-RS). The communication unit 310 may include different communication modules to process signals in different frequency bands. In addition, the communication unit 310 may include a plurality of communication modules for supporting a plurality of different radio access technologies. For example, the different radio access technologies may include one or more of Bluetooth low energy (BLE), Wi-Fi, Wi-Fi Gigabyte (WiGig), and cellular network (for example, long-term evolution (LTE), new radio (NR)). Further, different frequency bands may include a super high frequency (SHF) (for example, 2.5 GHz and 5 GHz) band and a millimeter (mm) wave (for example, 38 GHz and 60 GHz) band. The communication unit 310 may use the same type of radio access technology (RAT) in different frequency bands (for example, Licensed Assisted Access (LAA)), an unlicensed band for Listen Before Talk (LBT), and Citizens Broadband Radio Service (CBRS) (for example, 3.5 GHz).

The communication unit 310 may be configured to transmit or receive the signal as described above. Accordingly, all or some of the communication unit 310 may be referred to as a "transmitter", a "receiver", or a "transceiver". Also, the transmission and reception performed through a wireless channel, which is described in the following descriptions, may be understood to mean that the above-described processing is performed by the communication unit 310.

The storage unit 320 may store data such as a basic program, an application program, and setting information for the operation of the terminal 120. The storage unit 320 may be configured as volatile memory, non-volatile memory, or a combination of volatile memory and non-volatile memory. Further, the storage unit 320 may provide stored data in response to a request from the controller 330. According to various embodiments, the storage unit 320 may store frequency information for each beam. Beam information may include information on beams of the terminal 120. For example, frequency information for each beam may include a frequency location (for example, a channel number) in which the cell for each beam of the terminal 120 exists. According to various embodiments, the storage unit 320 may store channel information. For example, the channel information may include a channel quality for a signal received through the beam of the terminal 120. The channel quality may be stored for each channel. Further, the channel information may include information on channels which can be found by the terminal 120 in a band supported by the terminal 120 or information on channels preferred by the terminal 120. According to various embodiments, the storage unit 320 may include information (for example, an offset between component carriers (CCs) on channels supporting a particular communication technology (for example, carrier aggregation (CA)). The controller 330 may control the overall operation of the terminal 120. For example, the controller 330 may instruct the communication unit 310 to transmit or receive a signal. Further, the controller 330 may record data in the storage unit 320 and read or retrieve the data. In addition, the controller 330 may perform the functions of a protocol stack required by the communication standard. In some embodiments, the controller 330 may include at least one processor or microprocessor, or may be configured to emulate a processor. A portion of the communication unit 310 and the controller 330 may be referred to as a CP. The controller 330 may include various modules for performing communication.

According to various embodiments, the controller 330 may include a beamforming unit 331, a beam-specific automatic gain control (AGC) unit 333, and a frequency scanning unit 335. The beamforming unit 331 may receive a signal that is transmitted to the terminal 120 or transmit a signal to another node through a particular beam. That is, the beamforming unit 331 may perform transmission beamforming or reception beamforming techniques. The beam-specific AGC unit 333 may control reception of a signal by performing AGC for each beam in order to perform beam-based frequency scanning according to various embodiments. The frequency scanning unit 335 may construct a channel list in which the cell exists. The frequency scanning unit 335 may establish a channel and compare a channel quality of a signal received on the established channel with a reference value or compare a peak value with a peak threshold value, so as to determine the presence of the cell in each channel. Further, the frequency scanning unit 335 may determine the presence of the cell in each channel by decoding system information. The beamforming unit 331, the beam-specific AGC unit 333, and the frequency scanning unit 335 may be a set of instructions or code stored in the storage unit 320, and may correspond to an instruction/code at least temporarily resided in the controller 330, a storage space storing the instruction/code, a portion of the circuit included in the controller 330, or a module for performing the function of the controller 330. According to various embodiments, the controller 330 may control the terminal 120 to perform operations according to various embodiments described below.

The configuration of the terminal 120 illustrated in FIG. 3 is only an example of the terminal 120, and the terminal 120 is not limited thereto. That is, according to various embodiments, some elements may be added, deleted, or changed.

Figure 4A:
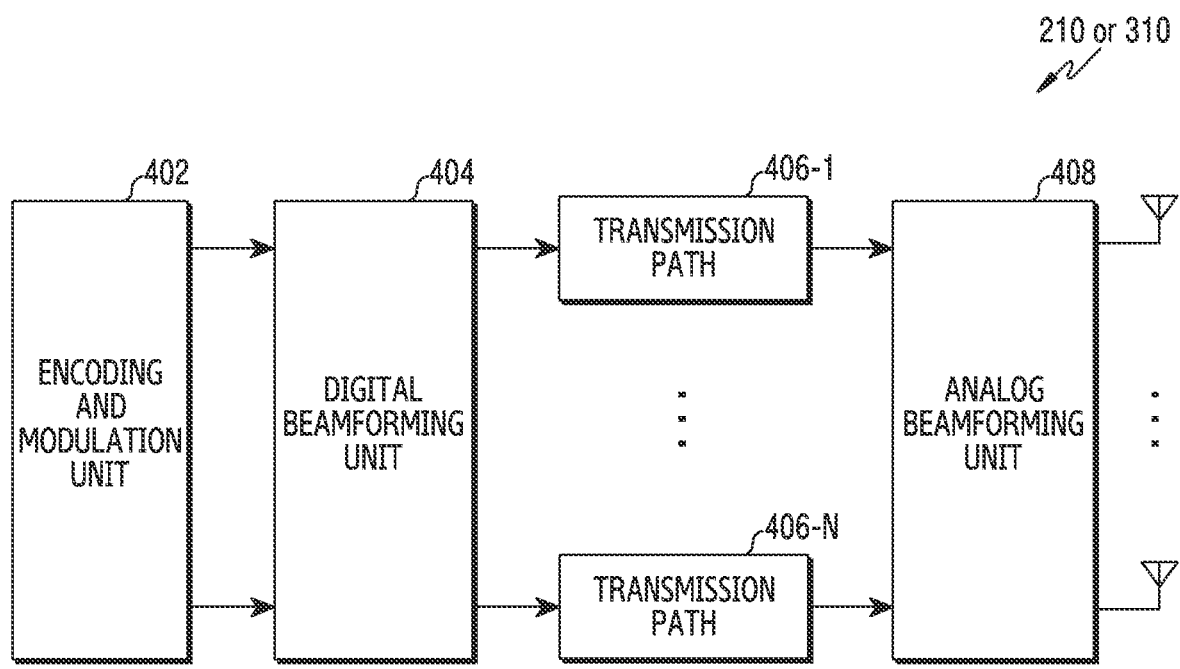
FIGS. 4A, 4B, and 4C illustrate the configuration of a communication unit in a wireless communication system according to various embodiments of the disclosure.
Figure 4B:
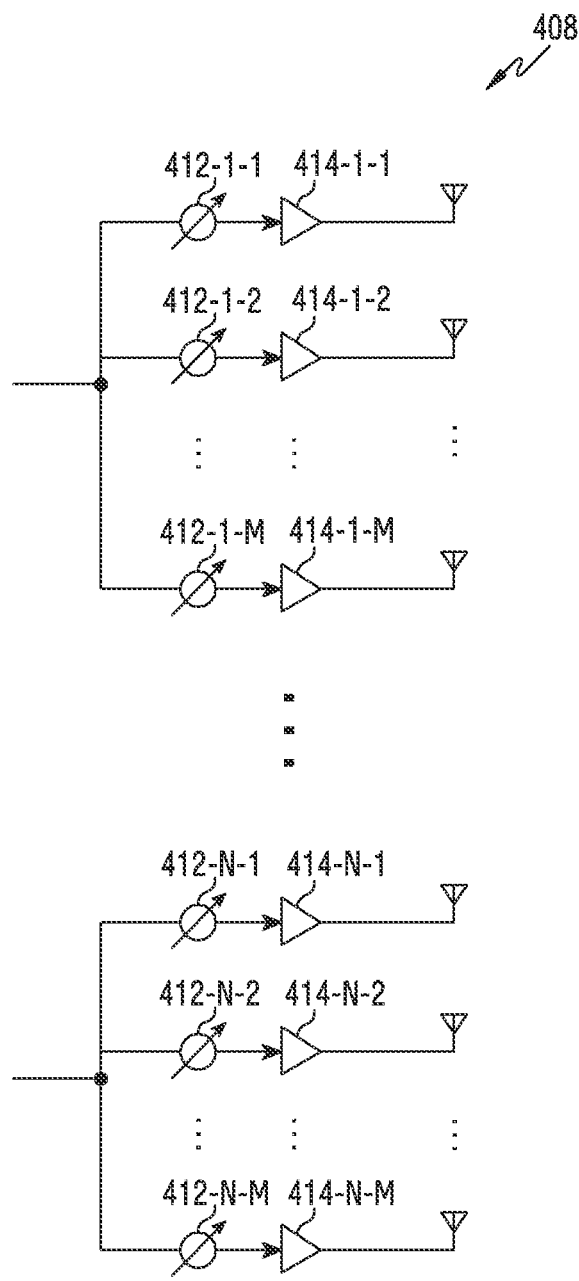
Figure 4C:
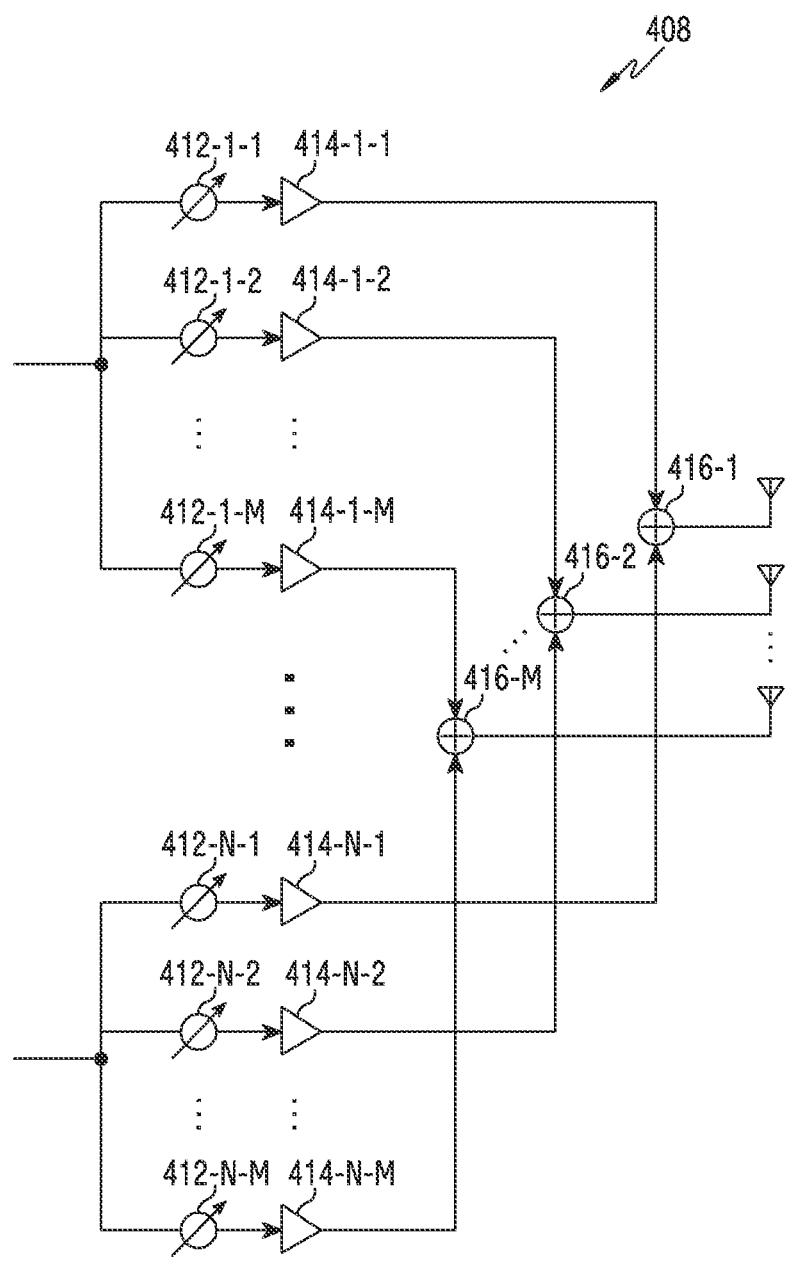

FIGS. 4A, 4B, and 4C illustrate a configuration of a communication unit in a wireless communication system according to various embodiments of the disclosure. FIGS. 4A, 4B, and 4C illustrate an example of the detailed configuration of the wireless communication unit 210 of FIG. 2 or the communication unit 310 of FIG. 3. Specifically, FIGS. 4A, 4B, and 4C illustrate elements of the wireless communication unit 210 of FIG. 2 or the communication unit 310 of FIG. 3 for performing beamforming techniques.

Referring to FIG. 4A, the wireless communication unit 210 or the communication unit 310 may include an encoding and modulation unit 402, a digital beamforming unit 404, a plurality of transmission paths 406-1 to 406-N, and an analog beamforming unit 408.

The encoding and modulation unit 402 may perform channel encoding. For the channel encoding, at least one of a low-density parity check (LDPC) code, a convolution code, and a polar code may be used. The encoding and modulation unit 402 may generate modulation symbols by performing constellation mapping.

The digital beamforming unit 404 may perform beamforming for a digital signal (for example, modulation symbols). In an embodiment, the digital beamforming unit 404 may multiply the modulation symbols by beamforming weighted values. The beamforming weighted values may be used for changing the size and phase of the signal, and may be referred to as a "precoding matrix" or a "precoder". The digital beamforming unit 404 may output the digitally beamformed modulation symbols to the plurality of transmission paths 406-1 to 406-N. At this time, according to a multiple-input multiple-output (MIMO) transmission scheme, the modulation symbols may be multiplexed, or the same modulation symbols may be provided to the plurality of transmission paths 406-1 to 406-N.

The plurality of transmission paths 406-1 to 406-N may convert the digitally beamformed digital signals into analog signals. For example, each of the plurality of transmission paths 406-1 to 406-N may include one or more of an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier (FBMC)) is applied. In an embodiment, the plurality of transmission paths 406-1 to 406-N may provide independent signal-processing processes for a plurality of streams generated through the digital beamforming. However, depending on the implementation, some of the elements of the plurality of transmission paths 406-1 to 406-N may be used in common.

The analog beamforming unit 408 may perform beamforming on analog signals. For example, the digital beamforming unit 404 may multiply the analog signals by beamforming weighted values. The beamformed weighted values may be used to change the size and phase of the signal. More specifically, the analog beamforming unit 408 may be configured as illustrated in FIG. 4B or 4C according to a connection structure between the plurality of transmission paths 406-1 to 406-N and the antennas.

Referring to FIG. 4B, signals input into the analog beamforming unit 408 may be transmitted through the antennas via phase/size conversion and amplification operation. At this time, the signals in respective paths are transmitted through different antenna sets or antenna arrays. In the processing of signals input through a first path, the signals may be converted into signal sequences having the same or different phase/size by phase/size conversion units 412-1-1 to 412-N-M, amplified by amplifiers 414-1-1 to 414-N-M, and transmitted through antennas.

Referring to FIG. 4C, the signals input into the analog beamforming unit 408 may be transmitted through the antennas via phase/size conversion and amplification operation. For example, the signals in respective paths may be transmitted through the same antenna set, that is, the antenna array. In the processing of signals input through a first path, the signals may be converted into signal sequences having the same or different phase/size by the phase/size conversion units 412-1-1 to 412-N-M and may be amplified by the amplifiers 414-1-1 to 414-N-M. Further, in order to be transmitted through one antenna array, the amplified signals may be summed by summing units 416-1 to 416-M and then transmitted through the antennas.

FIG. 4B illustrates an example in which an independent antenna array is used for each transmission path 406-1 to 406-N, and FIG. 4C illustrates an example in which the transmission paths 406-1 to 406-N share one antenna array. However, according to another embodiment, some transmission paths may use independent antenna arrays and the remaining transmission paths may share one antenna array. Further, according to yet another embodiment, a structure that may adaptively vary depending on the situation may be used by applying a switchable structure between transmission paths and antenna arrays.

A terminal including the wireless communication unit 210 or the communication unit 310 may perform communication through AGC (for example, receive gain tracking). The AGC is a function of maintaining the size of the signal to be larger than or equal to a target power. The terminal including the wireless communication unit 210 or the communication unit 310 may normally transmit and receive a signal by complementing movement of the terminal, fading due to obstacles, or path loss through the AGC. In a beamforming-based communication system, the size of the received signal and the antenna reception gain may vary depending on the beam. When all directions are tracked through only one gain value, it may be difficult to maintain a smooth communication system in a beamforming environment. Since the gain may vary depending on the beam formed in the beamforming gain communication system, the terminal may be required to perform the AGC in beam units.

Beam-Based Frequency Scanning

Figure 5:
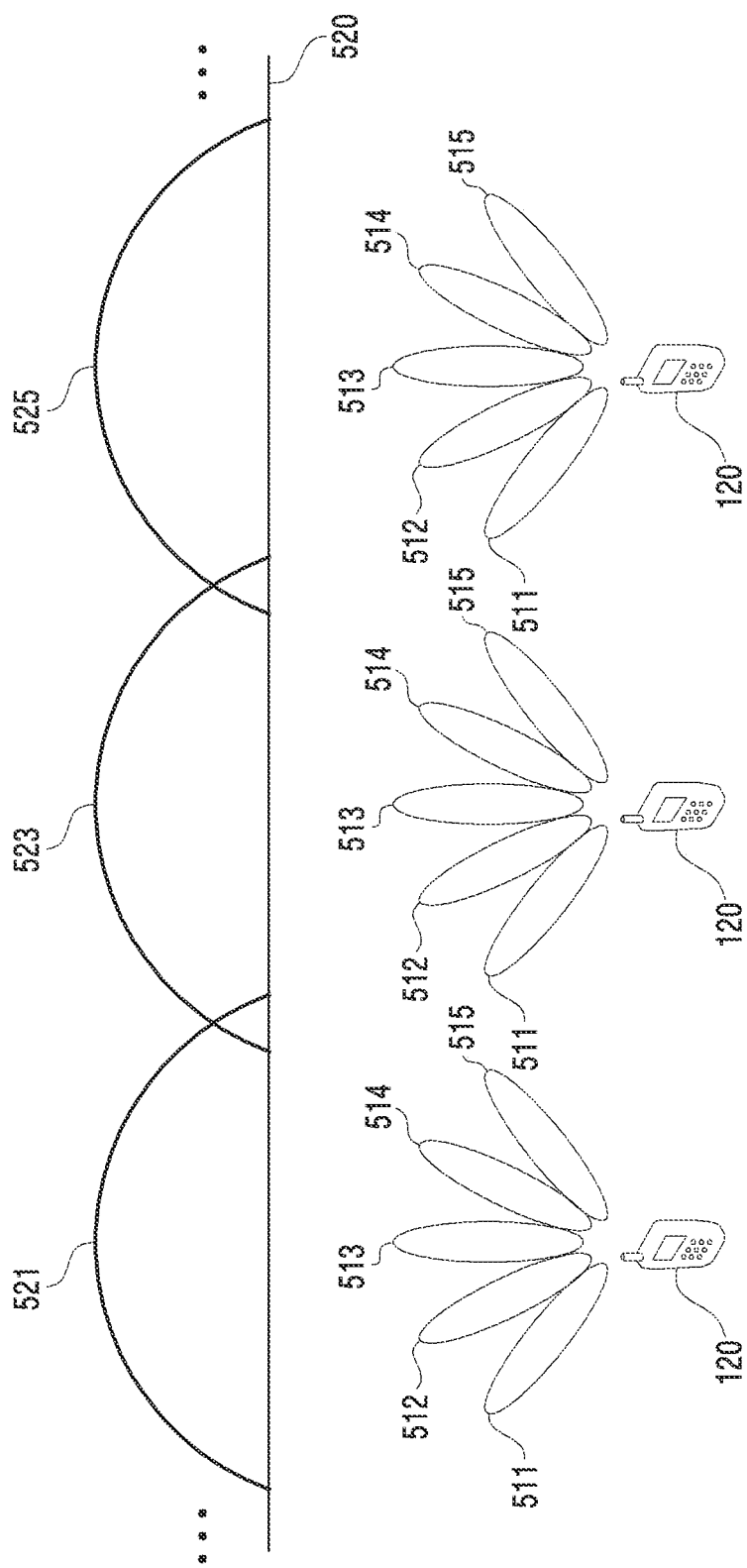
FIG. 5 illustrates an example of beam-based frequency scanning in a wireless communication system according to an embodiment of the disclosure.

FIG. 5 illustrates an example of beam-based frequency scanning in a wireless communication system according to an embodiment of the disclosure. The beam-based frequency scanning may be a procedure in which a terminal determines whether there is a cell associated with each channel through a beam in a beamforming communication system. According to various embodiments, the terminal may determine whether there is a cell while scanning to a different beam in each channel Hereinafter, terms and premised elements required for describing beam-based frequency scanning of the disclosure are defined in FIG. 5. However, the disclosure is not limited to terms defined in FIG. 5 and other terms having an equivalent technical meaning may be used. FIG. 5 illustrates an example in which the terminal receives a signal from at least one BS in order to describe beam-based frequency scanning.

Referring to FIG. 5, the terminal 120 may access a network. The terminal 120 may identify a BS or a cell in order to access the network. The cell may be a unit to provide a service by the BS in a frequency band. One BS may be associated with one cell or a plurality of cells. The terminal 120 may search for a cell in a frequency band 520 in order to identify the cell. For example, the terminal 120 may be booted and attempt access to the network. The terminal 120 may be required to search for the cell in order to receive a normal cellular service from the network. The terminal 120 may search for a frequency channel for the corresponding cell to find the cell. That is, the terminal 120 may perform frequency scanning to identify the cell used to re-establish communication with the network.

The terminal 120 may search for the cell in the frequency band 520. The terminal 120 may detect the presence or absence of the cell by searching for the frequency in units of channel raster (for example, 15 kHz or 100 kHz). The terminal 120 may establish a channel to be searched for while changing a channel number according to an absolute RF channel number (ARFCN). For example, the terminal 120 may search for a first channel 521, a second channel 523, and a third channel 525. The terminal 120 may determine whether there is a cell in each channel. The channel may be associated with the location on a frequency domain served by the BS.

The terminal 120 may perform beamforming. The terminal 120 may perform beamforming in order to transmit a signal to another node (for example, the BS 110) or receive a signal from another node. For example, the terminal 120 may receive signals through a first beam 511, a second beam 512, a third beam 513, a fourth beam 514, and a fifth beam 515. The terminal 120 may search for a cell through a plurality of beams in order to determine the presence of the cell in a beamforming communication system. The terminal 120 may determine whether there is a cell in a direction for which each of the plurality of beams is headed by sequentially changing and configuring the plurality of beams for frequency scanning A unit on a time domain in which the terminal 120 forms one beam and determines whether there is a cell in a particular channel may be referred to as a beam instance. For example, the terminal 120 may search for a cell while sequentially scanning through the first beam 511, the second beam 512, the third beam 513, the fourth beam 514, and the fifth beam 515 in every instance for frequency scanning. The terminal 120 may determine whether there is a cell on each beam. The beam may be associated with the physical location of the BS.

In the beamforming communication system, the terminal 120 may perform AGC for each beam in order to determine the presence of the cell. The terminal 120 may acquire an optimal gain value for each beam. The terminal 120 may perform gain tracking for each beam. As the number of beams available to the terminal 120 increases, a time for searching for the presence of the cell increases. In addition, as broadband is allocated to a cellular communication system, a search space of the frequency to be searched for by the terminal 120 may further increase. According to the increase in the frequency search space, time spent on frequency scanning may further increase.

In order to solve the problems, a scheme by which the terminal 120 according to various embodiments of the disclosure may reduce the time spent on frequency scanning is provided. A ratio of the time spent on the AGC process performed for each beam in the cell search to the total time may be high. In order to reduce the time spent on AGC for each beam, a scheme for reducing the number of beams used for the search may be required. The terminal 120 may more efficiently perform frequency scanning by reducing the number of beams the terminal 120 scans for frequency scanning or by reducing the frequency search space (or the number of channels).

Figure 6:
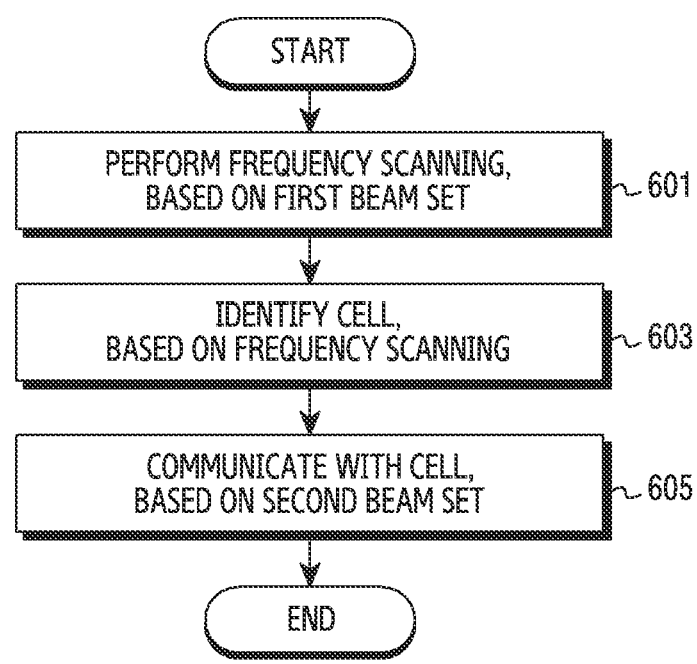
FIG. 6 is a flowchart illustrating an operation for beamforming through beam-based frequency scanning by a terminal in a wireless communication system according to an embodiment of the disclosure.

FIG. 6 is a flowchart illustrating an operation for beamforming through beam-based frequency scanning by a terminal in a wireless communication system according to an embodiment of the disclosure. FIG. 6 illustrates a method of operating the terminal 120.

Referring to FIG. 6, in operation 601, the terminal 120 may perform frequency scanning on the basis of a first beam set. The first beam set may include beams for frequency scanning. The beams for frequency scanning are referred to as scan beams. The second beam set may include beams for communication (for example, data transmission or reception) with the BS after frequency scanning is performed. The beams for communication (for example, cellular communication) with the BS are referred to as communication beams or data beams.

The terminal 120 may construct or generate a channel list based on the presence or absence of a cell in each scan frequency and reception power detected during frequency scanning. The terminal 120 may reset reception power in consideration of antenna gain loss reduced by beamforming. The terminal 120 may determine the presence or absent of the cell on the basis of complemented reception power and acquire a channel list. Accordingly, the terminal 120 may configure the first beam set such that the number of beams for performing the AGC is reduced in frequency scanning A time during which beams of the first beam set are controlled may be shorter than a time during which beams of the second beam set are controlled. A time during which the beams of the first beam set are swept during the frequency scan may be shorter than a time during which the beams of the second beam set are swept. A time during which AGC for each of the beams of the first beam set is performed may be shorter than a time during which AGC for each of the beams of the second beam set is performed. The number of beams of the first beam set may be smaller than the number of beams of the second beam set.

According to various embodiments, the terminal 120 may configure the first beam set with beams having a beam width wider than a beam width of each of the beams of the second beam set. By configuring the first beam set having the wider beam width, the terminal 120 may sweep a predetermined area through a smaller number of beams. The terminal 120 may perform frequency scanning in a predetermined area within a shorter time by using a smaller number of beams. For example, the terminal 120 may reduce the number of beams used for AGC by using omni-beams or beams having a relatively wider beam width for the AGC. Various embodiments for the configuration of the first beam set associated with wide beams will be described in detail with reference to FIG. 8A.

According to various embodiments, the terminal 120 may configure the first beam set with at least one of the beams of the second beam set. In other words, the beams of the second beam set may include the beams of the first beam set. The beams of the first beam set may include some (i.e., less than all) of the beams of the second beam set. That is, the first beam set may partially include the second beam set. The number of beams of the first beam set may be smaller than the number of beams of the second beam set. The terminal 120 may perform frequency scanning within a shorter time by reducing the number of beam instances for frequency scanning Various embodiments for the configuration of the first beam set associated with part of the second beam set will be described in detail with reference to FIG. 8B.

The terminal 120 may perform frequency scanning through each of the beams of the first beam set. A signal gain acquired by the terminal 120 may vary depending on a beam used to receive the signal. Accordingly, the terminal 120 may perform AGC for each of the beams of the first beam set. The terminal 120 may control a signal gain for the beam such that a reception intensity of the signal received through the beam is within a predetermined range (for example, AGC swing). The terminal 120 may configure one of the beams of the first beam set as the scan beam and complement a signal gain corresponding to the configured beam so as to perform AGC for the corresponding scan beam.

The terminal 120 may receive and measure the signal through each of the beams of the first beam set by performing AGC for each beam. The terminal 120 may measure a channel quality of the received signal. The channel quality may be at least one of, for example, beam reference signal received power (BRSRP), reference signal received power (BSRP), reference signal received quality (RSRQ), received signal strength indicator (RSSI), signal to interference and noise ratio (SINR), carrier to interference and noise ratio (CINR), signal to noise ratio (SNR), error vector magnitude (EVM), bit error rate (BER), and block error rate (BLER). In the above example, other terms having the equivalent technical meaning or other metrics indicating channel quality may be used. In an embodiment, high channel quality may mean that a channel quality value related to the size of a signal is large or that a channel quality value related to an error rate is small. As the channel quality increases, a better wireless communication environment may be guaranteed. An optimal beam may be a beam having the highest channel quality among the beams. Hereinafter, the channel quality of the signal used for frequency scanning will be described on the basis of an RSSI.

The terminal 120 may measure the channel quality of the signal transmitted on channels through each of the beams of the first beam set. For example, a measurement operation may be referred to as an RSSI scan. The received signal may include a synchronization signal. For example, the synchronization signal may be at least one of a PSS, a SSS, and an extended SS (ESS). Further, for example, the synchronization signal may be an SS block. The received signal may include a reference signal. For example, the reference signal may be at least one of a BSR, a beam refinement RS (BRRS), a CRS, a Channel State Information-RS (CSI-RS), and a demodulation-RS (DM-RS).

The terminal 120 may determine whether there is a cell in a search channel. The search channel may be a channel in which the terminal 120 performs frequency scanning among the channels corresponding to the frequency band. The terminal 120 may determine whether there is a cell in the search channel through a scan beam. According to various embodiments, the terminal 120 may determine whether there is a cell in the corresponding channel based on a received signal. The terminal 120 may determine whether there is a cell in the channel based on at least one of a channel quality of the received signal, a peak value of a synchronization signal included in the signal, and a decoding result of information included in the signal. Various embodiments associated with whether there is a cell on the search channel, that is, determination of whether there is a cell will be described in detail with reference to FIG. 9.

The terminal 120 may perform frequency scanning using the first beam set while scanning beams or channels in various ways. In some embodiments, the terminal 120 may establish the channel, measure a signal received in the corresponding channel through each of the beams of the first beam set, and then establish the next channel That is, the terminal 120 may perform frequency scanning while changing beams in every search instance. In some embodiments, the terminal 120 may establish the beam and then measure the signal received in each channel while sequentially changing channels within the band to be searched. When channels within the band are all found, the terminal 120 may change beams and measure the signal received in each channel again.

The terminal 120 may acquire a channel list through frequency scanning. The channel list may include at least one channel in which the cell exists among the search channels of at least one frequency band. When there is a cell on the configured scan beam and the established search channel, the terminal 120 may add the corresponding search channel to the channel list. The terminal 120 may repeatedly update the channel list while changing the scan beam or the search channel in such a way. The terminal 120 may acquire the channel list for each beam by performing frequency scanning through each of the beams of the first beam set.

According to an embodiment, the terminal 120 may not only acquire the channel list through frequency scanning but also configure initial synchronization for each cell. The initial synchronization may be synchronization for the cell on the frequency domain. The terminal 120 may apply a cell frequency offset (CFO) to configure the initial synchronization. The configuration of the initial synchronization may be more effective in a strong electric field. The terminal 120 may configure initial synchronization for the cell after frequency scanning Hereinafter, the disclosure is described on the basis of beam-based frequency scanning to search a cell for convenience of description, but the terminal 120 may configure not only beam-based frequency scanning but also initial synchronization in all the following embodiments.

Meanwhile, when the terminal 120 does not find a channel in which the cell exists, the terminal 120 may not acquire the channel list. When the terminal 120 does not acquire the channel list, the terminal 120 cannot access the network. Although not illustrated in FIG. 6, the terminal 120 may end the cell search procedure and again perform frequency scanning after a predetermined time. Even through the first beam set is configured by a smaller number of beams, when the frequency scanning fails, a delay may occur due to the first beam set. The terminal 120 according to various embodiments may perform the frequency scanning procedure again in order to reduce the delay due to failure of the frequency scanning Various embodiments associated with the frequency scanning performed again will be described in detail with reference to FIGS. 10A and 10B.

In operation 603, the terminal 120 may identify a cell based on frequency scanning. The terminal 120 may acquire a channel list based on the frequency scanning. The terminal 120 may sort channels of the channel list based on the channel quality (for example, RSSI) of each channel. The terminal 120 may identify at least one cell based on the channels of the channel list. For example, the terminal 120 may identify at least one cell by determining a cell Identifier (ID) based on a PSS and an SSS acquired in each channel. The terminal 120 may identify a cell which the terminal 120 accesses among cell(s) identified by the channel list. The terminal 120 may identify the cell which the terminal 120 accesses based on the channel quality. For example, the terminal 120 may identify a cell having the highest channel quality among the cells in the channel list. The terminal 120 may identify a cell having the highest RSRP among the cells. According to an embodiment, when cells for CA are found, the terminal 120 may identify two or more cells for the CA.

In operation 605, the terminal 120 may communicate with the cell based on the second beam set. The terminal 120 may camp on the cell identified in operation 603. The terminal 120 may perform random access and make an RRC connection with the BS of the corresponding cell by decoding system information for the cell. After establishing an RRC connection, the terminal 120 may be connected to the cell. Thereafter, the terminal 120 may perform a beam training procedure for the second beam set. The terminal 120 may receive downlink data or transmit uplink data through at least one beam identified by the second beam set. For example, the terminal 120 may receive a signal from the BS through each of the beams of the second beam set. The terminal 120 may determine the beam having the highest channel quality of the received signal as an optimal beam. The terminal 120 may receive downlink data through the optimal beam. Alternatively, in another example, the terminal 120 may transmit an uplink signal through each of the beams of the second beam set and determine a feedback beam among the beams of the second beam set as the optimal beam. The terminal 120 may transmit uplink data through the optimal beam.

As illustrated in FIG. 6, in the AGC process for each beam in frequency scanning (or initial synchronization), the terminal 120 may use the first beam set configured for operating the frequency scanning (or initial synchronization) without directly using the second beam set for data transmission and reception. By operating the first beam set, the terminal 120 may perform frequency scanning within a shorter time compared to the case in which the second beam set is operated. According to various embodiments, the terminal 120 may configure the first beam set to include a smaller number of beams than the beams of the second beam set. As the number of beam instances to perform the cell search by the terminal 120 decreases, time spent on frequency scanning may be shorter. Further, the terminal 120 may further reduce the time spent on frequency scanning by decreasing the number of channels to be searched for in connection with the beam.

According to various embodiments, the beam set used before the cell identification and the beam set used after the cell identification may be different from each other. As the beam sets used by the terminal 120 before and after the cell identification are different, it may be determined whether to perform the beam-based frequency scanning according to the disclosure. As illustrated in FIG. 6, the configuration of the first beam set for frequency scanning of the terminal 120 and the configuration of the second beam set after cell identification may be different. As the number of beams of the first beam set is smaller than the number of beams of the second beam set, it may be determined whether to perform the beam-based frequency scanning.

Figure 7:
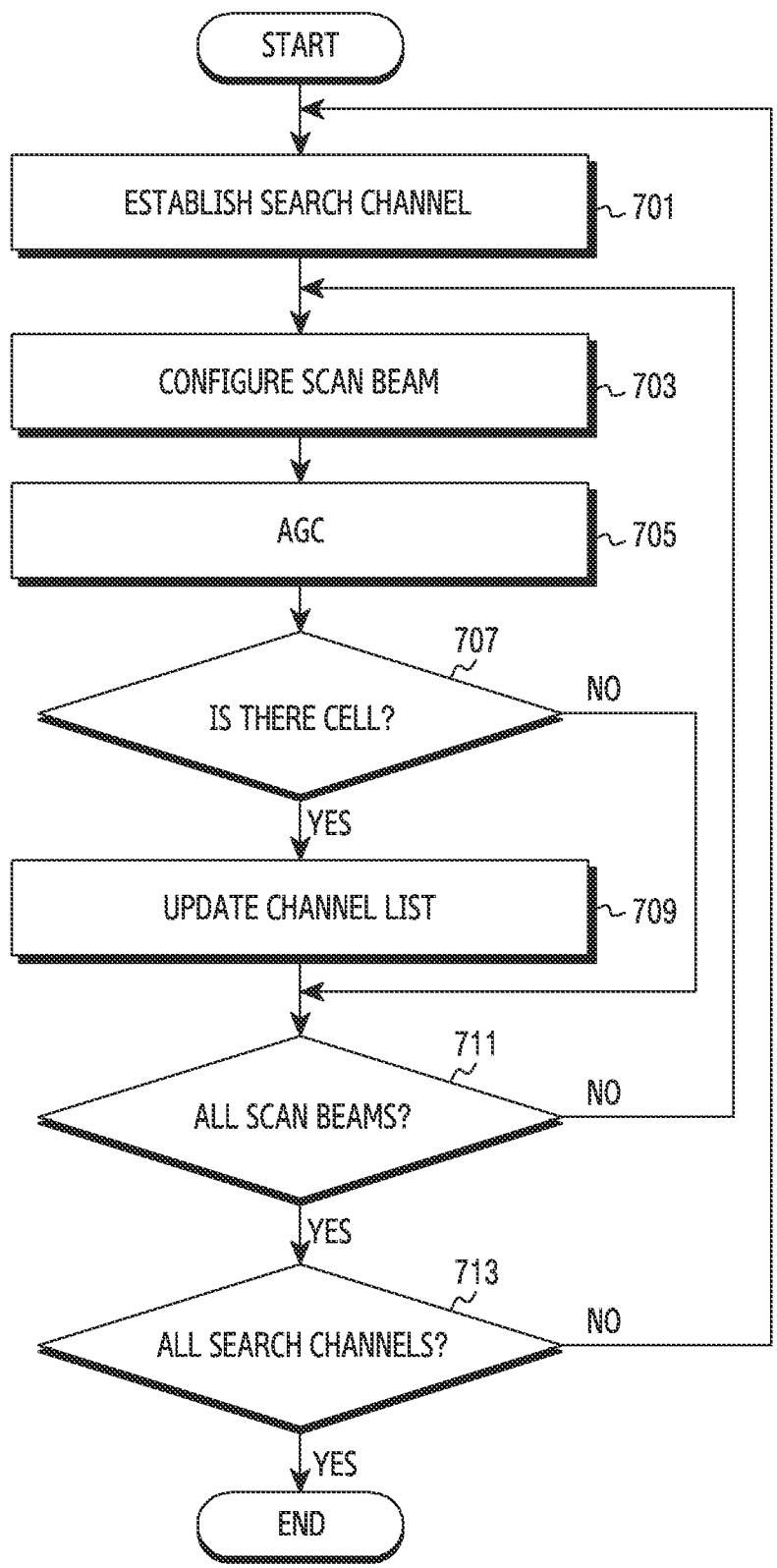
FIG. 7 is a flowchart illustrating an operation for beam-based frequency scanning of a terminal in a wireless communication system according to an embodiment of the disclosure.

FIG. 7 is a flowchart illustrating an operation for beam-based frequency scanning of a terminal in a wireless communication system according to an embodiment of the disclosure. FIG. 7 illustrates a method of operating the terminal 120.

Referring to FIG. 7, in operation 701, the terminal 120 may establish a search channel. The terminal 120 may configure search channels from the channels on the frequency band. That is, the terminal 120 may configure at least some of the channels separated by channel numbers on the frequency band as search channels. The terminal 120 may configure the search channels by changing the channel numbers on the frequency band in units of channel raster whenever an outer cycle of FIG. 7 is repeated. The size of the configured search channel may correspond to the channel raster.

The frequency band may be determined according to capability of hardware such as a filter or a transceiver supported by the terminal 120. In some embodiments, the terminal 120 may separate all frequencies on the frequency band in units of channel raster to establish search channels and repeatedly configure each channel. In some embodiments, the terminal 120 may configure some of the frequency bands as search bands, configure channels corresponding to the search bands as search channels, and then repeatedly configure each channel.

In operation 703, the terminal 120 may configure a scan beam. In order to determine whether there is a cell, the terminal 120 may configure the scan beam. The terminal 120 may change the scan beam whenever an inner cycle of FIG. 7 is repeated. In order to determine whether are cells within a predetermined area (hereinafter, a sector) from the terminal 120, the terminal 120 may configure a beam having a direction different from that of the previous beam as the scan beam in every inner cycle.

According to various embodiments, the terminal 120 may configure all beams which can be supported by the terminal 120 as scan beams. According to various embodiments, the terminal 120 may configure some of the beams which can be supported by the terminal 120 as scan beams. For example, when the terminal 120 includes a plurality of RF chains and the RF chains are separated for each band, the terminal 120 may differently configure scan beams for each RF chain or each band.

In operation 705, the terminal 120 may perform AGC. The terminal 120 may perform AGC for the beam configured in operation 703, that is, the scan beam. The terminal 120 may complement the gain of the scan beam such that a signal transmitted in the search channel configured in operation 701 is normally received by the terminal 120 through the scan beam. The terminal 120 may reconfigure reception power by complementing the gain.

In operation 707, the terminal 120 may determine whether there is a cell. The terminal 120 may receive and measure a signal on the basis of the AGC for the scan beam. The terminal 120 may determine whether there is a cell in the configured search channel on the basis of at least one of the channel qualities of the received signal and the signal according to the measurement. When it is determined that there is the cell in the search channel, the terminal 120 may perform operation 709. When it is determined that there is no cell in the search channel, the terminal 120 may perform operation 711.

In operation 709, the terminal 120 may update a channel list. The channel list may be a list of channels in which the cell exists among the search channels. When it is determined that there is the cell in the configured channel, the terminal 120 may update the channel list to include the configured channel.

In operation 711, the terminal 120 may determine whether a scan of all scan beams of the cell is performed. The scan beam may be a beam used for the cell search (frequency scanning) by the terminal 120. When a determination that all scan beams is performed, the terminal 120 may perform operation 713. When there is a scan beam for which the determination of whether there is a cell is not performed among the scan beam, the terminal 120 may perform operation 703 again.

In operation 713, the terminal 120 may determine whether a scan of all search channels is performed. The search channel may be a channel in which the terminal 120 searches for a cell for frequency scanning as described in FIG. 6. When the determination that a scan of all search channels is performed, the terminal 120 may end the frequency scanning procedure. When a scan of all search channels has not been performed, the terminal 120 may perform operation 701 again.

In FIG. 7, the example in which the terminal 120 first configures the search channels and determines whether there is a cell while sequentially changing scan beams, and then changes the search channels to sequentially change the scan beams again has been described. However, the disclosure is not limited thereto. The terminal 120 may first configure the scan beams and change each of the search channels in the corresponding scan beam to determine whether there is a cell in each channel That is, in the embodiment illustrated in FIG. 7, the order in which the scan beams are scanned and the order in which the search channels are scanned by the terminal 120 according to various embodiments of the disclosure are not limited. According to an embodiment, the terminal 120 may determine whether to first configure search channels and then sweep the scan beams or first configure scan beams and then determine whether there is a cell in each of the search channels based on the number of search channels and the number of scan beams.

Configuration of Beam Set

FIG. 8A illustrates an example of a configuration of scan beams of a terminal in a wireless communication system according to an embodiment of the disclosure. A beam set for frequency scanning may be referred to as a wide beam set, and a beam set for cellular communication with the BS after frequency scanning is performed may be referred to as a sharp beam set. The terminal 120 may configure a scan beam with a wider beam width than that of a data beam. By configuring the scan beam with a wider beam width, the terminal 120 may perform a cell search for a predetermined area within a shorter time. This is because, as the beam width is wider, the number of beams covering the predetermined area may be reduced and a time during which the terminal 120 forms beams for frequency scanning may be shorter. For example, when frequency scanning is performed on a sector corresponding to a central angle of 180 degrees from the center of the terminal 120 through beams having a beam angle of 20 degrees, nine beams may be needed to perform the frequency scan. However, when frequency scanning is performed on the sector using beams having a beam angle of 60 degrees, only three beams may be included in the frequency scan. As the time for the use of one beam, that is, the beam instance reduced three times, the terminal 120 may perform frequency scanning within the time reduced three times. Hereinafter, for description of the configuration of scan beams, the state in which frequency scanning is performed using a sharp beam set and the state in which frequency scanning is performed using a wide beam set are described together.

Referring to FIG. 8A, in a wireless environment 810, the terminal 120 may perform frequency scanning using beams of the sharp beam set. The sharp beam set may include nine different beams. For example, the sharp beam set may include a first beam 811, a second beam 812, a third beam 813, a fourth beam 814, a fifth beam 815, a sixth beam 816, a seventh beam 817, an eighth beam 818, and a ninth beam 819. The terminal 120 may configure search channels and perform beamforming using each of the first beam 811 to the ninth beam 819 so as to determine whether there is a cell in the search channel configured in each beam. When a first BS 110-1, a second BS 110-2, or a third BS 110-3 transmits a synchronization signal on the configured search channel, the terminal 120 may receive and measure the signal in the configured search channel by performing AGC on each of the first beam 811 to the ninth beam 819. The terminal 120 may perform AGC on each of a total of nine beams in order to determine whether there is a cell in the configured search channel Nine beam instances may be required in each channel. However, when the terminal 120 performs AGC on all of the nine beams and receives the signal in every channel like the data beam set, the number of unnecessary searches increases and the time spent on frequency scanning may increase.

In the wireless environment 820, the terminal 120 may perform frequency scanning using beams of the wide beam set. The terminal 120 may perform frequency scanning with a smaller number of beams by operating the beams having a wider beam width. The wide beam set may include three different beams. For example, the wide beam set may include a first wide beam 821, a second wide beam 822, and a third wide beam 823. The terminal 120 may configure search channels and form the first wide beam 821 to the third wide beam 823 so as to determine whether there is a cell in the configured search channels. When the first BS 110-1, the second BS 110-2, or the third BS 110-3 transmits a synchronization signal on the configured search channel, the terminal 120 may receive and measure the signal in the configured search channel by performing AGC on each of the first wide beam 821 to the third wide beam 823.

The terminal 120 may perform AGC on each of a total of three beams in order to determine whether there is a cell in the configured search channel. In an embodiment, the terminal 120 may complement a gain according to a beam width difference when AGC is performed by operating scan beams having a beam width different from the beam width of the beams of the sharp beam set (or data beam set). Due to trade-offs between the beam width and the beam gain, a beam gain difference in a particular direction may be generated. When configuring the wide beam set including beams having a relatively wide beam width, the terminal 120 may perform AGC on the basis of a gain difference between beams. Since the terminal 120 performs AGC on three beams in every channel, the terminal 120 may perform frequency scanning during a shorter time compared to the wireless environment 810.

By performing frequency scanning using scan beams having the beam width wider than that of the data beams as illustrated in FIG. 8A, the terminal 120 may complete the frequency scanning within a shorter time compared to the case in which the frequency scanning is performed using data beams. According to an embodiment, the scan beam having the wide beam width may include an omni-beam.

The terminal 120 according to various embodiments may determine the beam width of the scan beam. That is, the beam width of the scan beam may be adaptively configurable. The terminal 120 may control how wide the beam width of the scan beam is formed compared to the beam width of the data beam.

According to an embodiment, the terminal 120 may determine the beam width on the basis of an operation mode. For example, in order to acquire a channel list accurately reflecting the channel state of each of the cells adjacent to the terminal 120, the terminal 120 may operate in a first operation mode. The beam width of the scan beam formed in the first operation mode may be narrower than or equal to a reference beam width. Conversely, in order to access the network at an earlier time point in spite of somewhat low accuracy of the channel list, the terminal 120 may operate in a second operation mode. The beam width of the scan beam formed in the second operation mode may be wider than the reference beam width. The reference beam width may be a beam width which is the reference to distinguish the first operation mode and the second operation mode. The terminal 120 according to various embodiments of the disclosure may operate not only the two operation modes but also more beam widths and operation modes. The terminal 120 may configure a range of the beam width corresponding to each of a plurality of levels and adaptively control the beam width according to the level.

In some embodiments, the terminal 120 may determine the beam width based on cell information. The cell information may be information related to the geographic location of the BS. The terminal 120 may acquire cell information in advance. For example, the terminal 120 may acquire the cell information in advance when the terminal 120 accesses the network. In another example, the terminal 120 may store the cell information in advance by a network operator. The terminal 120 may acquire information on neighboring cells of the current terminal 120 based on the cell information. Information on whether the cell is adjacent to the terminal 120 may be determined based on whether the corresponding cell is located within a predetermined distance area from the terminal 120. As an amount of information on neighboring cells is larger, the terminal 120 may determine a relatively narrower beam width. Conversely, as the number of cells adjacent to the terminal 120 is smaller, the terminal 120 may determine a relatively wider beam width. This is because, as the number of neighboring cells is smaller, the number of unnecessary instances may increase when a narrower beam is operated. Cell information may include not only information related to the geographic location of the BS but also acquired frequency information. The terminal 120 may determine the beam width to minimize interference between carriers. The terminal 120 may determine the beam width not to minimize interference between adjacent cells within one beam instance.

In some embodiments, the terminal 120 may determine the beam width based on history information. The history information may include the result of frequency scanning of the terminal 120 within a predetermined area. When the terminal 120 moves within a predetermined area, the terminal 120 may determine the beam width on the basis of history information. For example, when the terminal 120 repeatedly travels through a particular path, the terminal 120 may determine the beam width based on location information and frequency information of the cell related to the current location.

The terminal 120 may determine the beam width in other ways in addition to the above-described embodiments. For example, the terminal 120 may determine the beam width according to a user input. In another example, the terminal 120 may determine a fixed constant as a beam width narrower than the beam width of the data beam.

Although it is described that all beam widths are controlled by a parameter in FIG. 8A and the above embodiments, the disclosure is not limited thereto. The terminal 120 according to various embodiments may determine the number of scan beams instead of determining the beam width. For example, the terminal 120 may configure the number of scan beams in the first operation mode to be larger than or equal to a reference value. Further, the terminal 120 may configure the number of scan beams in the second operation mode to be smaller than the reference value. According to an embodiment, the number of scan beams may be inversely proportional to the beam width.

Although FIG. 8A illustrates embodiments in which the wide beam width is operated to cover the predetermined area, the terminal 120 may include the beam in the wide beam set even though the beam having the wide beam width does not necessarily cover the same predetermined area. That is, the terminal 120 may configure the wide beam set to reduce the time spent on frequency scanning and to cover a large number of areas within the sector.

Figure 8B:
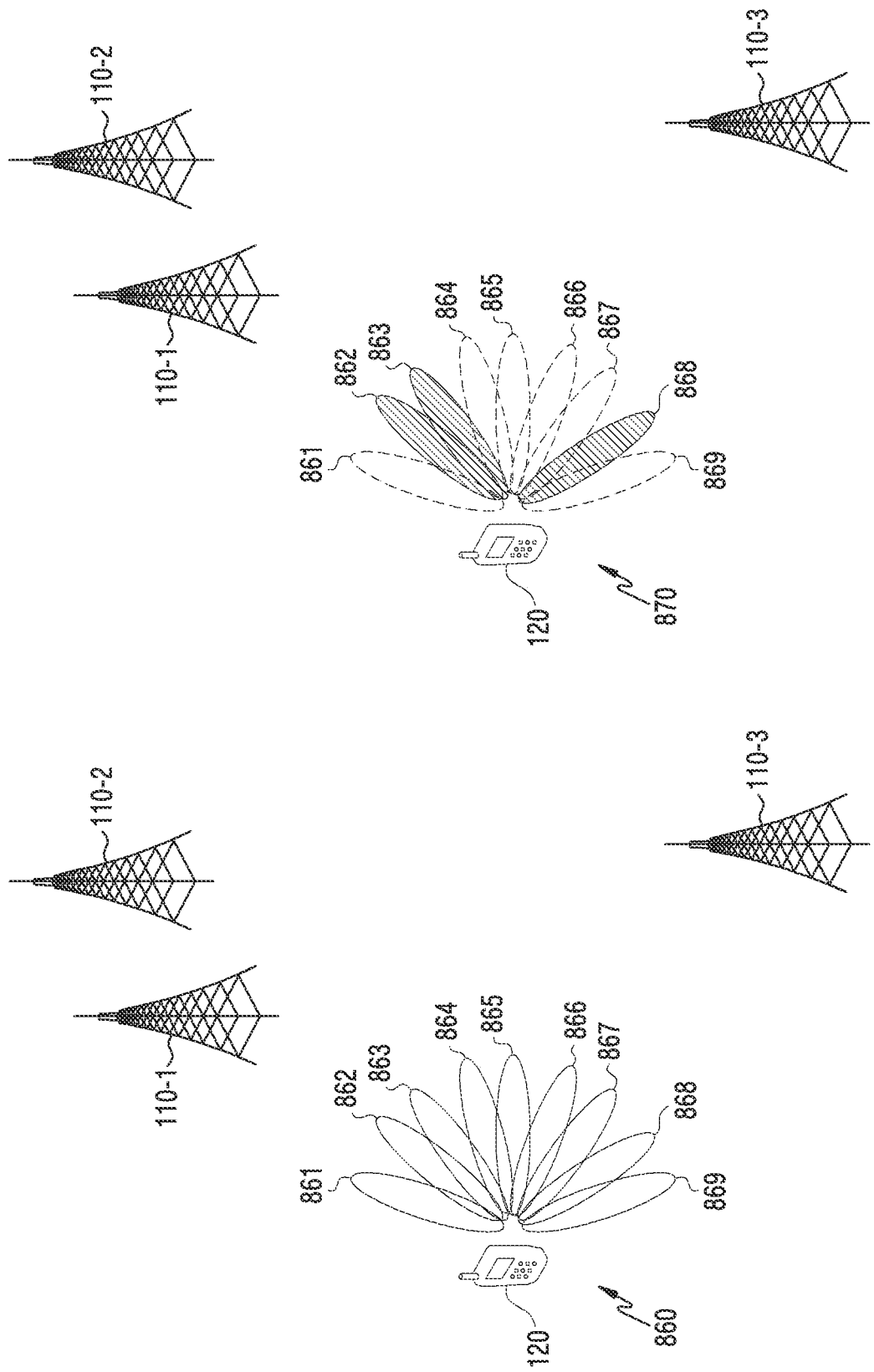
FIG. 8B illustrates another example of a configuration of scan beams of a terminal in a wireless communication system according to an embodiment of the disclosure.

FIG. 8B illustrates another example of a configuration of scan beams of a terminal in a wireless communication system according to an embodiment of the disclosure. A beam set for frequency scanning may be referred to as a partial beam set, and a beam set for cellular communication with the BS after frequency scanning may be referred to as a full beam set. The terminal 120 may configure a smaller number of scan beams than the full beam set. The terminal 120 may perform the cell search within a shorter time by configuring some of the beams of the full beam set with scan beams. This is because the time spent on forming different beams may be reduced. Hereinafter, for description of the configuration of scan beams, the state in which frequency scanning is performed using the partial beam set and the state in which frequency scanning is performed using the full beam set are described together.

Referring to FIG. 8B, in the wireless environment 860, the terminal 120 performs frequency scanning through beams of the full beam set. The full beam set may include nine different beams. For example, the full beam set may include a first beam 861, a second beam 862, a third beam 863, a fourth beam 864, a fifth beam 865, a sixth beam 866, a seventh beam 867, an eighth beam 868, and a ninth beam 869. The terminal 120 may configure search channels and determine whether there is a cell in the search channels configured in each beam by performing beamforming (or beam sweeping) on each of the first beam 861 to the ninth beam 869. When the first BS 110-1, the second BS 110-2, or the third BS 110-3 transmits a synchronization signal on the configured search channel, the terminal 120 may receive and measure the signal in the configured search channel by performing AGC on each of the first beam 861 to the ninth beam 869. However, when the terminal 120 performs AGC and frequency scanning on all of the nine beams in every channel like the data beam set, the number of unnecessary searches may increase and the time spent on frequency scanning may increase.

In the wireless environment 870, the terminal 120 may perform frequency scanning through the beams of the partial beam set. The terminal 120 may perform frequency scanning with a smaller number of beams by operating only some of the beams of the full beam set as scan beams. For example, the partial beam set may include three beams. The partial beam set may include the second beam 862, the third beam 863, and the eighth beam 868. The terminal 120 may configure search channels and determine whether there is a cell in the configured search channels through each of the second beam 862, the third beam 863, and the eighth beam 868. When the first BS 110-1, the second BS 110-2, or the third BS 110-3 transmits a synchronization signal on the configured search channel, the terminal 120 may receive and measure the signal in the configured search channel by performing AGC on each of the second beam 862, the third beam 863, and the eighth beam 868. Since the number of beams on which the AGC for each beam is performed decreases, the terminal 120 may perform frequency scanning during a shorter time compared to the wireless environment 860.

As illustrated in FIG. 8B, it is possible to complete frequency scanning within a shorter time by performing the frequency scanning through a smaller number of beams than the beams managed after the connection to the BS.

The terminal 120 according to various embodiments may determine the number of scan beams. That is, the number of scan beams may be adaptively configurable. The number of scan beams may be smaller than the number of data beams. The terminal 120 may determine how many scan beams are formed for frequency scanning according to various embodiments.

In some embodiments, the terminal 120 may determine the number of scan beams based on the operation mode. For example, in order to acquire a channel list more accurately reflecting the channel state, the terminal 120 may operate in a first operation mode. The number of scan beams formed in the first operation mode may be larger than a reference number and smaller than the number of data beams. Conversely, in order to access the network at an earlier time point in spite of somewhat low accuracy of the channel list, the terminal 120 may operate in a second operation mode. The number of scan beams formed in the second operation mode may be smaller than the reference number. The reference number may be a reference value of the number of scan beams to distinguish the first operation mode and the second operation mode. The terminal 120 according to various embodiments of the disclosure may configure not only the two operation modes but also a plurality of levels and configure a range of the number of scan beams corresponding to each level so as to adaptively control the number of scan beams according to the level.

In some embodiments, the terminal 120 may determine the number of scan beams based on cell information. The cell information may be information related to the geographic location of the BS. The terminal 120 may determine the number of scan beams based on the location of the BS providing the cell. The terminal 120 may exclude a beam of the full beam set corresponding to beam coverage at which the BS is not located among coverages, that is, beam coverages from a scan beam list. In some embodiments, the terminal 120 may reduce an unnecessary frequency scanning procedure based on the cell information. Further, the terminal 120 may determine which beam will be used as the scan beam as well as the number of scan beams based on the cell information as described below.

In some embodiments, the terminal 120 may determine the number of scan beams based on a movement direction of the terminal 120. The terminal 120 may acquire the movement direction of the terminal 120. The terminal 120 may determine each of the beams corresponding to the movement direction among the beams of the full beam set of the terminal 120 as the scan beam. This is because a beam having a direction different from the movement direction of the terminal 120 is highly likely to have a low channel quality and has a high possibility of handover according to movement in spite of the connection.

The terminal 120 according to various embodiments may determine which beam will be used as the scan beam among a plurality of beams. That is, the terminal 120 may determine a sweeping pattern of the scan beam. The terminal 120 may determine at least one of the beams of the full beam set as the scan beam. In some embodiments, the terminal 120 may determine scan beams at the same intervals according to the predetermined number of scan beams. For example, the number of beams of the full beam set may be thirty-nine and the number of scan beams may be thirteen. The terminal 120 may form each group to include three beams according to correlation of physical directions formed by the beams of the full beam set and determine one beam in each group as the scan beam.

In some embodiments, the terminal 120 may determine the scan beam in a predetermined pattern. A scan pattern for beam-based frequency scanning may be defined. The scan pattern may be the array of scan beams to make a possibility in which the cell is located in a direction indicated by a beam among the beams of the full beam set high. The terminal 120 may determine at least one of the beams of the full beam set as the scan beam on the basis of the scan pattern and the number of scan beams. For example, the scan pattern may be randomly determined. In another example, the scan pattern may be determined based on motion information of the terminal 120 (for example, movement, slope, or rotation). In another example, the scan pattern may be determined on the basis of sensor information (for example, a gravity sensor, a gyro sensor, or a proximity sensor).

In some embodiments, the terminal 120 may determine the scan beam based on cell information. The terminal 120 may determine the scan beam based on the acquired location of the BS. For example, the terminal 120 may acquire the location of the BS adjacent to the terminal 120 and the location of the terminal 120 based on pre-stored map information and global positioning system (GPS) information of the current location of the terminal 120. The terminal 120 may acquire beam information corresponding to the direction for the BS from the terminal 120. The terminal 120 may determine the scan beam based on beam information.

In another embodiment, the terminal 120 may determine the scan beam based on history information. The history information may include information on a beam usage history of the terminal 120 in a predetermined area or location. For example, the terminal 120 may determine the scan beam based on a history of reception beam information used at a predetermined location.

Although FIG. 8B illustrates examples in which some of the full beam set are operated as the partial beam set, even the beam which is not completely the same may be operated as the scan beam. That is, even a beam which is differently formed from each of the beams of the full beam set, for example, a beam having a different beam width may be configured as the scan beam by the terminal 120. The terminal 120 may configure a smaller number of scan beams than the beams of the full beam set.

FIG. 8A illustrates an embodiment in which the beam width of the scan beam is adaptively configured and FIG. 8B illustrates an embodiment in which the number of scan beams is adaptively configured. However, the embodiments of the configuration of the scan beams illustrated in FIGS. 8A and 8B are only examples, and the disclosure is not limited thereto. The configuration of the scan beams according to various embodiments of the disclosure includes the configuration of all scan beams configured such that a time (hereinafter, referred to as a beam scan time) for forming each of the beams of the beam set for the scan beam may be shorter than a time for forming each of the beams of the beam set for the data beam. For example, the embodiments of FIGS. 8A and 8B may be combined. The terminal 120 may configure a set of scan beams, which have a wider beam width than the data beam and correspond to a smaller number than the beams of the data beam set. Accordingly, the terminal 120 may more efficiently perform beam-based frequency scanning.

Determination of Cell Presence

Figure 9:
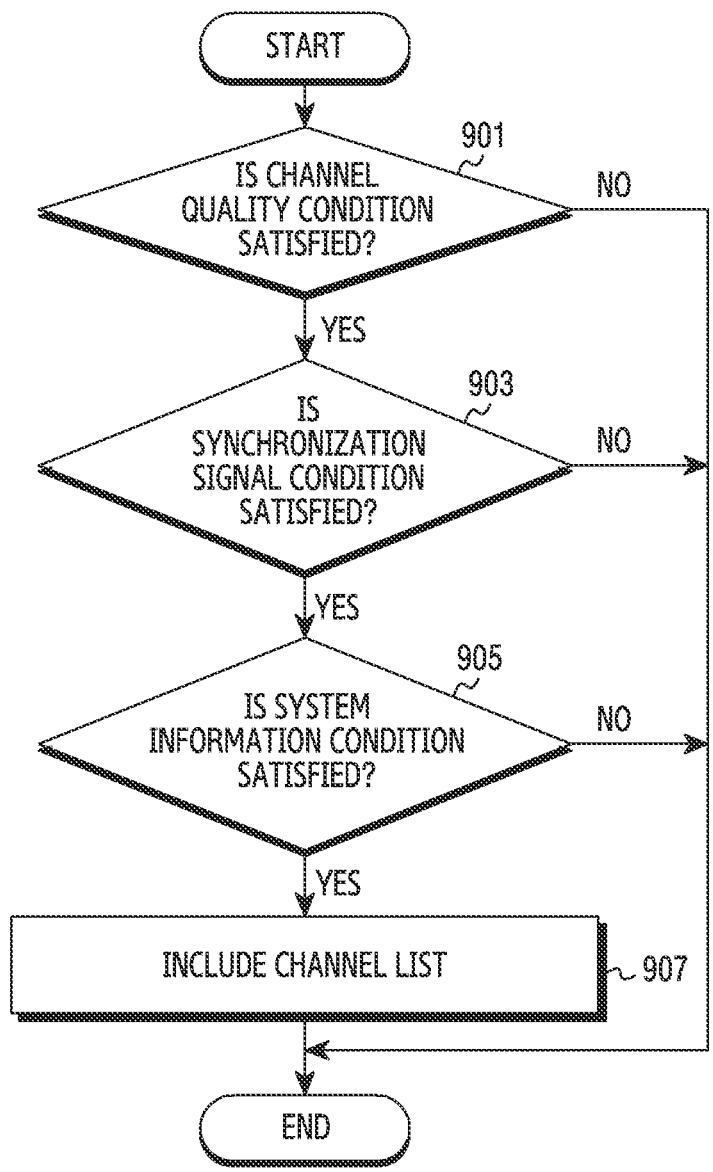
FIG. 9 is a flowchart illustrating an operation for determining cell presence by a terminal in a wireless communication system according to an embodiment of the disclosure.

FIG. 9 is a flowchart illustrating an operation for determining the cell presence by a terminal in a wireless communication system according to an embodiment of the disclosure. FIG. 9 illustrates a method of operating the terminal 120. It is assumed that the terminal 120 establishes a search channel. When it is determined that there is a cell in the configured search channel, the terminal 120 may insert the configured search channel into a channel list. Conversely, when it is determined that there is no cell in the search channel, the terminal 120 may end the procedure of FIG. 9.

Referring to FIG. 9, the terminal 120 may determine whether a channel quality condition is satisfied in operation 901. According to various embodiments, the channel quality condition may be a channel quality of a signal received through AGC of the configured beam that is higher than or equal to a threshold value. For example, when RSSI of the received signal is higher than or equal to the threshold value, the terminal 120 may determine that the channel quality condition is satisfied in the corresponding search channel and scan beam. The threshold value may be adaptively configurable. For example, when frequency scanning repeatedly fails, the terminal 120 may decrease the threshold value. Alternatively, the threshold value may be a fixed value. The terminal 120 may perform operation 903 when the channel quality condition is satisfied. When the channel quality condition is not satisfied, the terminal 120 may determine that there is no cell in the configured channel and ends the procedure of FIG. 9.

In operation 903, the terminal 120 may determine whether a synchronization signal condition is satisfied. According to various embodiments, the synchronization signal condition may be a peak value of at least one synchronization signal that is larger than or equal to a peak threshold value. The peak value of the synchronization signal may be a maximum value of correlation values between a synchronization sequence and a received signal. In some embodiments, the synchronization signal condition may be a peak value of a PSS of the received signal that is larger than or equal to a first peak threshold value and a peak value of an SSS of the received signal that is larger than or equal to a second peak threshold value. In some embodiments, the synchronization signal condition may be the peak value of the PSS of the received signal that is larger than or equal to the first peak threshold value. In some embodiments, the synchronization signal condition may be the peak value of the SSS of the received signal that is larger than or equal to the second peak threshold value. When the synchronization signal condition is satisfied, the terminal 120 may perform operation 905. When the synchronization signal condition is not satisfied, the terminal 120 may determine that there is no cell in the configured channel and ends the procedure of FIG. 9.

In operation 905, the terminal 120 may determine whether a system information condition is satisfied. According to various embodiments, the system information condition may be decoding of system information that is successful. The terminal 120 may determine whether the decoding of the system information is successful through a cyclic redundancy check (CRC). The system information may include at least one of a MIB, a SIB, RMSI, or OSI. In some embodiments, the system information condition may be decoding of the MIB is that successful. In some embodiments, the system information condition may be decoding of the MIB and decoding of the SIB that are successful. In some embodiments, the system information condition may be decoding of the MIB and decoding of the RMSI that are successful. When the system information condition is satisfied, the terminal 120 may perform operation 907. When the system information condition is not satisfied, the terminal 120 may determine that there is no cell in the configured channel and ends the procedure of FIG. 9.

In operation 907, the terminal 120 may insert the configured search channel into the channel list. The channel list may include channels in which the cell exists. The terminal 120 may determine that the cell exists on the configured search channel and the configured scan beam. According to various embodiments, the terminal 120 may make the configured scan beam correlate with the search channel. The terminal 120 may insert the channel correlated with the scan beam into the channel list.

Although FIG. 9 illustrates that it is determined that there is the cell on the configured channel only when the terminal 120 satisfies three conditions, the disclosure is not limited thereto. The terminal 120 may determine that the cell exists when at least one of the three conditions is satisfied. For example, when the RSSI is larger than or equal to the threshold value and the peak value of the PSS is larger than or equal to the peak threshold value, the terminal 120 may determine that there is the cell on the configured channel. Also, the terminal 120 may add an additional condition other than the three conditions and combine the additional condition with at least one of the channel quality condition, the synchronization signal condition, and the system information condition. The terminal 120 may determine whether there is the cell on the channel through a combination. According to various embodiments, the terminal 120 may be adaptively configurable to determine how many conditions are satisfied and determine whether there is a cell. In some embodiments, when there is no search channel in which the cell exists through frequency scanning, the terminal 120 may control the number of determination conditions.

Although not illustrated in FIG. 9, the terminal 120 may use decoded system information when accessing the cell when the success of decoding of the system information is the condition for determining whether there is a cell.

According to various embodiments, the number of search channels for each beam may be different according to the beam-based frequency scanning. This is because the number of cells located in the corresponding direction or a length of the band of the corresponding cell may be different according to the physical direction indicated by the beam. The terminal 120 may acquire a channel list including various numbers of search channels for each beam. Implementation of the beam-based frequency scanning according to the disclosure may be identified according to channel information for each beam within the channel list. According to an embodiment, the channel list may include at least one first channel related to the first scan beam and at least one second channel related to the second scan beam. In an embodiment, the number of at least one first channel may be different from the number of at least one second channel.

According to various embodiments, the number of times the AGC for each beam may be performed through the beam-based frequency scanning. The number of times the beam gain is controlled may be smaller than the number of total beams. That is, as the number of beam instances for frequency scanning decreases, implementation of the beam-based frequency scanning according to the disclosure may be identified.

With reference to FIGS. 5 to 9, the method of, in frequency scanning, configuring the beam set (hereinafter, the scan beam set) for frequency scanning instead of the beam set used for communication (for example, data transmission) after the connection to the BS has been described. The terminal 120 may use beams of the terminal 120 when transmitting a random access preamble. According to various embodiments, the terminal 120 may configure the scan beam set to include a smaller number of beams than beams of a beam set (hereinafter, a random access beam set) for performing random access. For example, the random access beam set may be the same as the data beam set. Alternatively, the terminal 120 may configure the scan beam set such that the beam of the scan beam set has a wider beam width than that of the beam of the random access beam set. Meanwhile, according to another embodiment, the disclosure does not exclude the case in which the beam set for performing the random access is the same as the scan beam set.

By operating a wider beam width or operating only some of all beams of the beam set for frequency scanning, that is, operating a small number of scan beams, a time spent on frequency scanning may be reduced. However, as the time is reduced, accuracy of the channel list acquired through the frequency scanning may be reduced. For example, when there is no channel included in the channel list, the terminal 120 may not have access to the network. In other words, when no channel in which the cell exists is found, the terminal 120 cannot access the network and thus a delay may occur until the terminal 120 accesses the network through frequency scanning after a predetermined time. Accordingly, a method of performing frequency scanning again to complement a failure probability of the frequency scanning may be considered instead of a method of configuring a smaller number of scan beam than the data beams. In an embodiment, when the frequency scanning is performed again, the beam set may be reconfigured. That is, the configuration of the beam set may be changed. This is because the frequency scanning may be more likely to fail when the same beam set is repeatedly used. The terminal 120 may acquire a more accurate channel list by performing the frequency scanning procedure again through the configuration of various scan beams. Hereinafter, FIG. 10A illustrates an embodiment in which frequency scanning is performed again using beams of the data beam set.

Complement Frequency Scanning

Figure 10A:
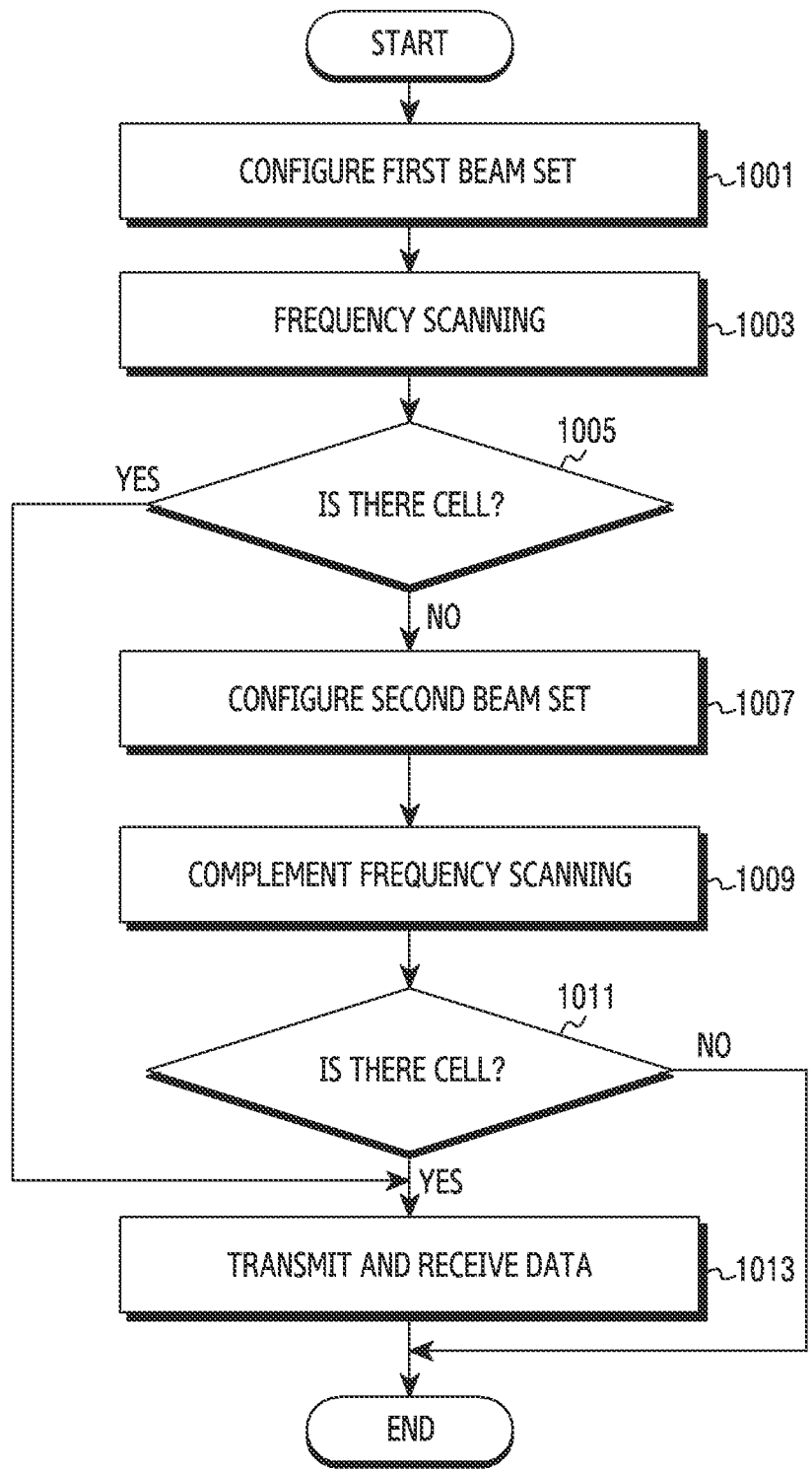
FIG. 10A is a flowchart illustrating an operation for complement frequency scanning by a terminal in a wireless communication system according to an embodiment of the disclosure.

FIG. 10A is a flowchart illustrating an operation for complement frequency scanning by a terminal in a wireless communication system according to an embodiment of the disclosure. FIG. 10A illustrates a method of operation the terminal 120.

Referring to FIG. 10A, in operation 1001, the terminal 120 may configure a first beam set. The terminal 120 may configure the first beam set for frequency scanning. The terminal 120 may configure the first beam set including scan beams. The configuration of the first beam set may be determined according to embodiments related to FIGS. 8A and 8B.

In operation 1003, the terminal 120 may perform frequency scanning. The terminal 120 may perform frequency scanning by performing AGC on each of the scan beams of the first beam set. The terminal 120 may perform frequency scanning by sequentially configuring search channels. The terminal 120 may measure a received signal in a direction of the scan beam on the search channel while sequentially changing a combination of the scan beam and the search channel.

In operation 1005, the terminal 120 may determine whether there is a cell on the search channels. The terminal 120 may determine whether there is a cell in at least one of the search channels on the basis of the received signal. Whether there is the cell in the search channel may be determined according to embodiments related to FIG. 9. When it is determined that there is no cell in all search channels, the terminal 120 may perform operation 1007. When it is determined that there is a cell even in at least one of the search channels, the terminal 120 may perform operation 1013.

In operation 1007, the terminal 120 may configure a second beam set. The terminal 120 may configure the second beam set when frequency scanning using the first beam set is failed. According to various embodiments, the second beam set may include a larger number of beams than the beams of the first beam set. A beam width of the beam of the second beam set may be narrower than a beam width of the beam of the first beam set. The beams of the second beam set may include the beams of the first bema set. The second beam set may be a set of beams which can be formed by the terminal 120 after the connection of the terminal 120 to the BS. That is, the second beam set may include data beams. In order to complement failure of the frequency scanning, the terminal 120 may determine the second beam set as a beam set for additional frequency scanning. In order to complement the frequency scanning, the terminal 120 may determine the beams of the second beam set as scan beams.

In operation 1009, the terminal 120 may perform complement frequency scanning. The terminal 120 may perform the complement frequency scanning in order to complement the frequency scanning using the first beam set. The terminal 120 may configure the second beam set with a larger number of beams than the first beam set and perform frequency scanning using the second beam set so as to increase a success rate of the cell search. Here, success of the cell search may mean that at least one channel in which a cell exists is found among the search channels.

In operation 1011, the terminal 120 may determine whether there is a cell on the search channels. Since operation 1011 corresponds to operation 1005, a detailed description of the duplicate configuration will be omitted. The terminal 120 may perform operation 1013 when there is at least one cell in the search channels. On the other hand, there is no cell in all search channels, the terminal 120 may end the frequency scanning procedure. Although not illustrated in FIG. 10A, the terminal 120 may perform the frequency scanning procedure again after a predetermined time. The terminal 120 may perform operation 1001 again.

In operation 1013, the terminal 120 may transmit and receive data. The terminal 120 may transmit and receive data on the basis of the second beam set. The terminal 120 may identify an optimal beam by sweeping each of the beams of the second beam set. The terminal 120 may receive downlink data through the data beam. Further, the terminal 120 may transmit uplink data through the data beam.

Although FIG. 10A illustrates the example in which two beam sets are operated, the disclosure is not limited thereto. The terminal 120 may operate a plurality of beam sets by controlling the number of scan beams or the beam width of the scan beam. Hereinafter, FIG. 10B illustrates embodiments in which the terminal 120 operates two or more beam sets and repeatedly performs frequency scanning.

Figure 10B:
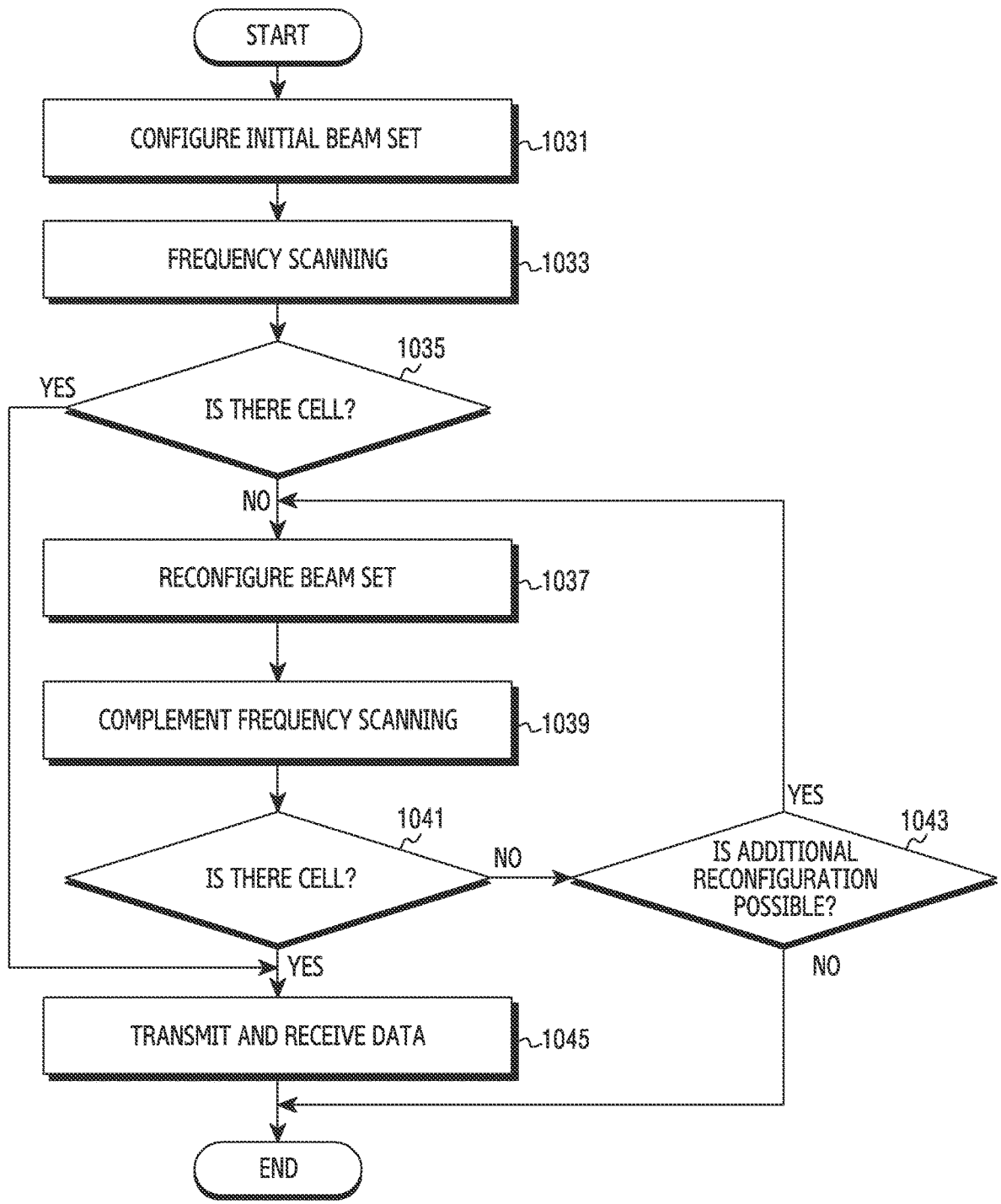
FIG. 10B is another flowchart illustrating an operation for complement frequency scanning by a terminal in a wireless communication system according to an embodiment of the disclosure.

FIG. 10B is another flowchart illustrating the operation for complement frequency scanning by a terminal in a wireless communication system according to an embodiment of the disclosure. FIG. 10B illustrates a method of operating the terminal 120.

Referring to FIG. 10B, in operation 1031, the terminal 120 may configure an initial beam set. The initial beam set may include scan beams configured for initially performed frequency scanning. According to an embodiment, a beam width of beams of the initial beam set may be configured as a maximum beam width. Thereafter, a beam width of beams operated in the following procedure may be narrower than the beam width of the beams of the initial beam set. According to another embodiment, the number of beams of the initial beam set may be configured as a minimum value. Thereafter, a beam width of beams operated in the following procedure may be narrower than the beam width of the beams of the initial beam set. According to another embodiment, the beams of the initial beam set may be configured to cover an area different from that of the beams operated in the following procedure.

In operation 1033, the terminal 120 may perform frequency scanning. The terminal 120 may perform frequency scanning by performing AGC on each of the scan beams of the initial beam set. Since operation 1033 corresponds to operation 1003 of FIG. 10A, a detail description of the duplicate configuration will be omitted.

In operation 1035, the terminal 120 may determine whether there is a cell on the search channels. Since operation 1035 corresponds to operation 1005 of FIG. 10A, a detail description of the duplicate configuration will be omitted. When there is no cell in all search channels, the terminal 120 may perform operation 1037. When there is a cell in at least one of the search channels, the terminal 120 may perform operation 1045.

In operation 1037, the terminal 120 may reconfigure a beam set. When frequency scanning using the initial beam set is failed, the terminal 120 may reconfigure the beam set. When the complement frequency scanning using the reconfigured beam set in the previous cycle is failed, the terminal 120 may reconfigure the beam set. In some embodiments, the terminal 120 may reconfigure the beam set to include beams having a beam width narrower than the beam width of the beams of the initial beam set or the reconfigured beam set in the previous cycle. The terminal 120 may reduce a frequency of occurrences of a shaded area between beams by forming the beam width to be relatively narrow. Further, according to an increase in beam coverage, a probability of searching of the cell may increase. In some embodiments, the terminal 120 may reconfigure the beam set such that the number of beams is larger than the beams of the beam set of the initial beam set (or the reconfigured beam set in the previous cycle). The terminal 120 may increase an area covered for frequency scanning by increasing the number of scan beams. According to the increase in the beam coverage, a probability of searching of the cell may increase. In some embodiments, the terminal 120 may reconfigure the beam set with beams different from that of the area covered by the beams of the initial beam set (or the reconfigured beam set in the previous cycle). For example, when the initial beam set includes the first beam 861 and the second beam 862, the terminal 120 may reconfigure the beam set to include the third beam 863, the fourth beam 864, the fifth beam 865, and the sixth beam 866. The terminal 120 may more efficiently perform frequency scanning by excluding duplicate beams.

In operation 1039, the terminal 120 may perform complement frequency scanning. The terminal 120 may perform complement frequency scanning in order to complement failure of the frequency scanning using the initial beam set or the reconfigured beam set in the previous cycle. The terminal 120 may increase a success rate of the cell search by reconfigure the beam set for frequency scanning.

In operation 1041, the terminal 120 may determine whether there is a cell on the search channels. Since operation 1041 corresponds to operation 1005 of FIG. 10A, a detail description of the duplicate configuration will be omitted. When there is no cell in all search channels, the terminal 120 may perform operation 1043 in order to determine whether an additional frequency scanning procedure is possible. However, when there is at least one cell in search channels, the terminal 120 may perform operation 1045.

In operation 1043, the terminal 120 may determine whether the additional reconfiguration is possible. When frequency scanning using the reconfigured beam set is failed, the terminal 120 may determine whether to reconfigure the beam set again. According to an embodiment, the terminal 120 may configure the number of additional reconfigurations. The terminal 120 may perform the additional reconfiguration until the number of reconfigurations reaches a predetermined limit value. According to another embodiment, the terminal 120 may configure an event for ending the additional reconfiguration. For example, when a time spent on frequency scanning passes a predetermined time after the time point at which the frequency scanning is attempted (for example, the initiation time point of operation 1033), the terminal 120 may end the additional reconfiguration. According to another embodiment, the terminal 120 may perform the additional reconfiguration until the beam width of the currently configured beam set becomes the narrowest beam width which can be operated by the terminal 120. When the beam width of the currently configured beam set is the narrowest beam width which can be operated by the terminal 120, the terminal 120 may end the additional reconfiguration. According to another embodiment, the terminal 120 may perform the additional reconfiguration until the beam width of the currently configured beam set becomes a maximum number of beams which can be operated by the terminal 120. When the number of beams of the currently beam set is the maximum number of beams which can be operated by the terminal 120, the terminal 120 may end the additional reconfiguration.

The terminal 120 may determine that the additional reconfiguration is possible when the additional reconfiguration can be performed. On the other hand, the terminal 120 may determine that the additional reconfiguration is impossible when the additional reconfiguration ends. When the additional reconfiguration is possible, the terminal 120 may perform operation 1037. When the additional reconfiguration is impossible, the terminal 120 may end the frequency scanning procedure. On the other hand, when there is no cell in all search channels, the terminal 120 may end the frequency scanning procedure. Although not illustrated in FIG. 10B, the terminal 120 may perform the frequency scanning procedure again after a predetermined time. The terminal 120 may perform operation 1031 again.

In operation 1045, the terminal 120 may transmit and receive data. The terminal 120 may identify the cell in the channel in which the cell exists among search channels. The terminal 120 may access the identified cell and transmit and receive data. The terminal 120 may transmit and receive data on the basis of a data beam set. The number of beams of the data beam set may be larger than the number of beams of the initial beam set. The number of beams of the data beam set may be larger than or equal to the number of beams of the reconfigured beam set. The terminal 120 may identify an optimal beam by sweeping each of the beams of the data beam set. The terminal 120 may receive downlink data through the data beam. Further, the terminal 120 may transmit uplink data through the data beam.

FIG. 10B illustrates an example in which a terminal reconfigures the beam set and performs frequency scanning. As illustrated in FIG. 10B, the terminal (e.g., terminal 120) may reconfigure the beam set by narrowing the beam width or increasing the number of beams. Further, the terminal may reconfigure the beam set to include beams sweeping coverage different from the current coverage. The terminal may perform frequency scanning by gradually reconfiguring the beam set from the initial beam set to the data beam set.

The apparatus and the method for operating beams in frequency scanning or initial synchronization in the beamforming-based communication system have been described with reference to FIGS. 5 through 10B. The terminal may efficiently perform frequency scanning by decreasing the number of beams for the frequency scanning Meanwhile, the terminal may reduce not only the number of scan beams but also the frequency search space. Hereinafter, an embodiment in which the terminal performs beam-based frequency scanning in consideration of CA will be described.

Beam-Based Frequency Scanning in CA

In order to achieve a higher data transmission rate, CA using two or more CCs is supported. On the basis of CA, the terminal may transmit or receive signals through a plurality of CCs within the same frequency band or CCs corresponding to different frequency band. According to demands for the higher data transmission rate, it may be necessary to support CA for aggregating many CCs.

The terminal may efficiently operate CA by performing frequency scanning in consideration of CA. For example, the terminal may configure cells for CA within a shorter time by acquiring synchronization for the Secondary cell (Scell) in advance before configuring the S cell. As the number of beams and channels within the band increases, complexity of frequency scanning may exponentially increase when it is determined whether there is a cell in every channel or every beam. At this time, the terminal may configure in advance a combination of channels (or a combination of CCs) for CA with low complexity by searching for channels for CA on the basis of characteristics between CCs. The terminal may reduce time spent on frequency scanning or initial synchronization by reducing candidates of channels subject to frequency scanning Hereinafter, FIGS. 11 to 12 illustrate beam-based frequency scanning for identifying channels for CA in the disclosure.

Figure 11:
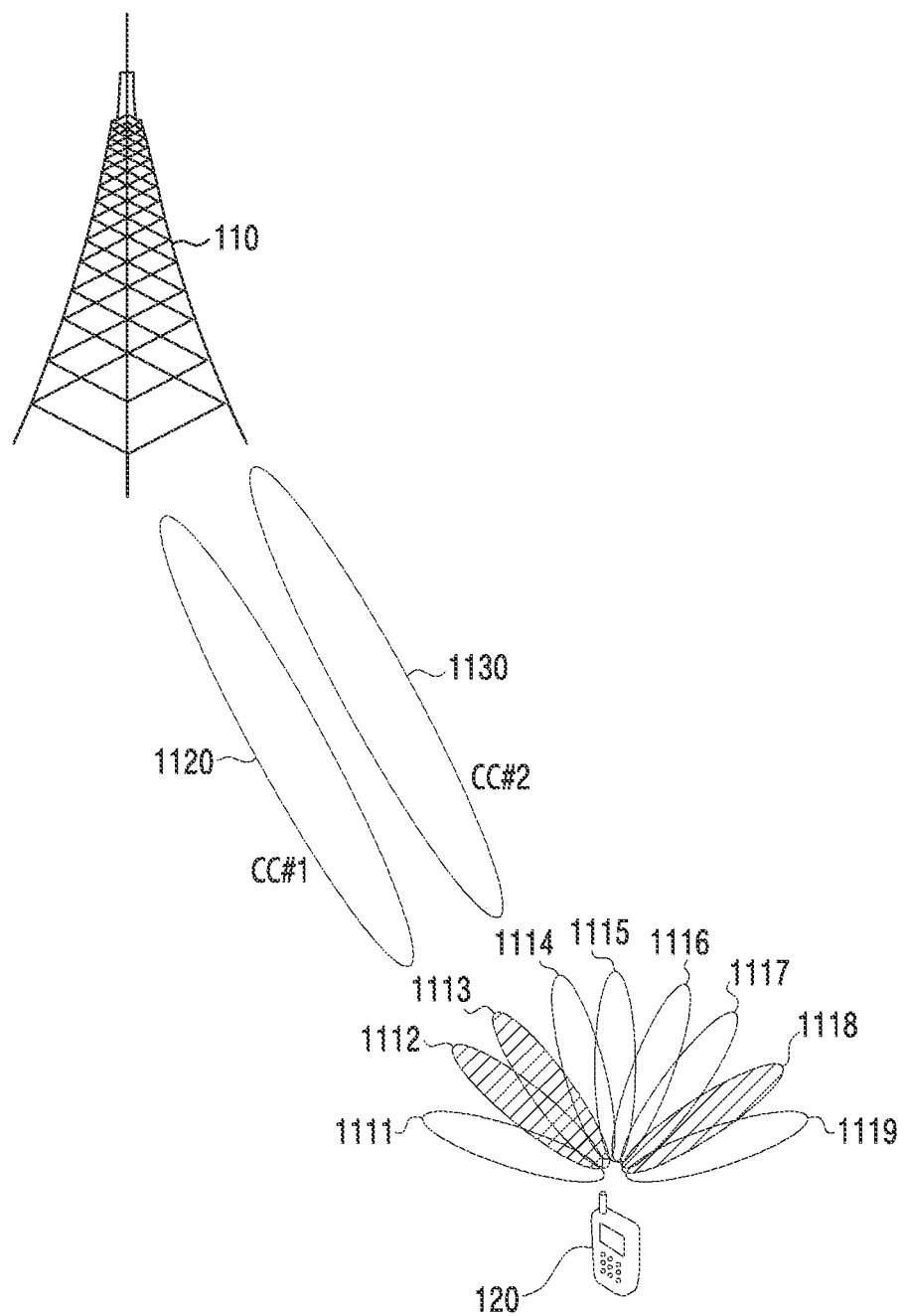
FIG. 11 illustrates an example of frequency scanning for CA in a wireless communication system according to an embodiment of the disclosure.
Figure 12:
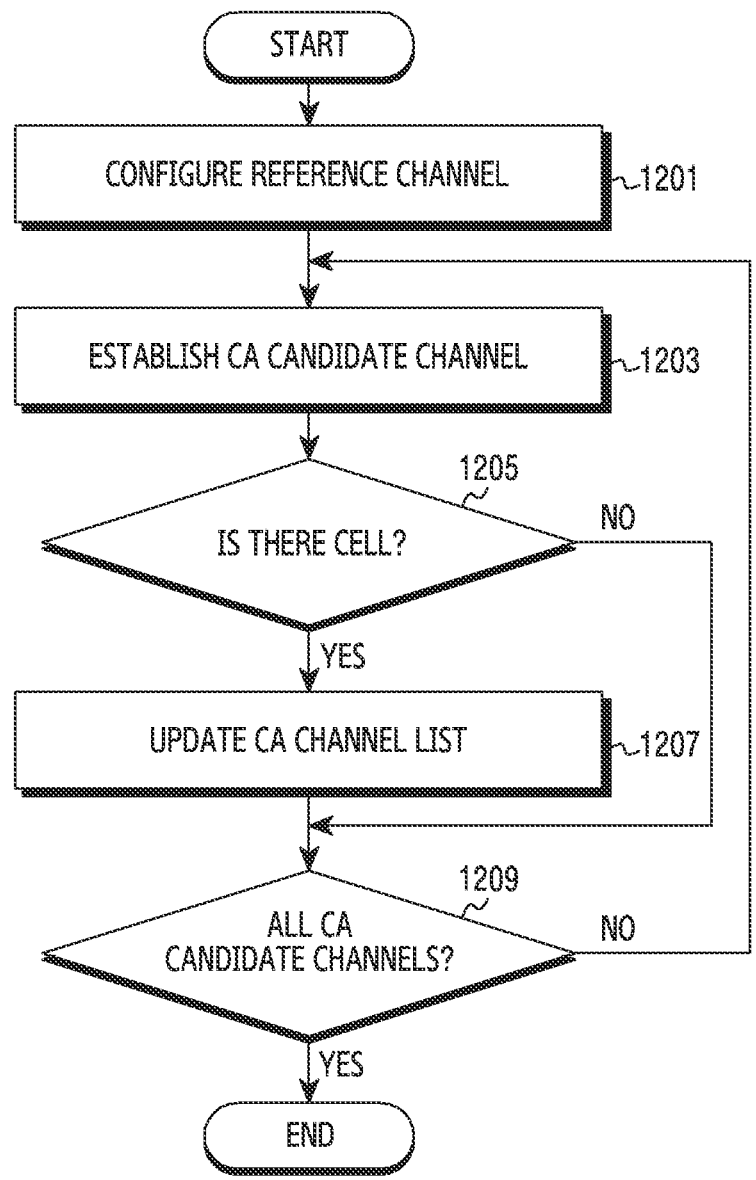
FIG. 12 is a flowchart illustrating an operation of frequency scanning for CA by a terminal in a wireless communication system according to an embodiment of the disclosure.

FIG. 11 illustrates an example of frequency scanning for CA in a wireless communication system according to an embodiment of the disclosure. An offset between CCs for CA may be predefined on a frequency band. A terminal 120 may efficiently identify channels for CA by using the offset between CCs in a channel search. By identifying channels according to an offset unit between CCs on the frequency band, the terminal 120 may more easily identify a combination of the channels for CA compared to the case in which channels are sequentially identified simply according to a channel raster unit. The terminal 120 may configure in advance a combination of channels for CA. Hereinafter, CA using two CCs will be described by way of an example in order to describe frequency scanning for CA.

Referring to FIG. 11, the terminal 120 may perform beamforming. The terminal 120 may form each of a plurality of beams. For example, the terminal 120 may form a first beam 1111, a second beam 1112, a third beam 1113, a fourth beam 1114, a fifth beam 1115, a sixth beam 1116, a seventh beam 1117, an eighth beam 1118, and a ninth beam 1119. The full beam set of the terminal 120 may include the first beam 1111 to the ninth beam 1119. According to an embodiment, the terminal 120 may perform frequency scanning with the partial beam set. The partial beam set may include the second beam 1112, the third beam 1113, and the eighth beam 1118.

The terminal 120 may perform CA. The terminal 120 may perform CA through a first CC 1120 and a second CC 1130. The terminal 120 may communicate with the BS 110 by configuring the first CC 1120 and the second CC 1130 through CA. At this time, for CA, the terminal 120 may first perform a search for cells (for example, a Primary cell (Pcell) and an Scell) included in CA. The terminal 120 may perform frequency scanning in order to search for the first CC 1120 and the second CC 1130. That is, the terminal 120 may perform frequency scanning to construct in advance a combination of the CCs for CA before access the network.

The terminal 120 may determine channels for CA based on an offset between cells. Here, the offset between cells may be predefined for CA. For example, a frequency interval between adjacent cells may be required to be a multiple of a predetermined frequency interval (for example, 15 kHz, 30 kHz, or 60 kHz) in order to make transmission/reception possible through one FFT. The frequency interval between cells may be an interval between central frequencies of respective cells. A frequency interval between different CCs in CA may be determined on the basis of channel raster (for example, 100 kHz or 15 kHz) corresponding to a channel unit or the predetermined frequency interval. For example, the interval between different CCs in CA may be a multiple of 300 kHz. 300 kHz may be a CA offset. In another example, the frequency interval between CCs may be a multiple of a fixed value (for example, 100 kHz). The fixed value may be a CA offset.

The terminal 120 may reduce candidates of search channels for frequency scanning on the basis of the CA offset. In some embodiments, the terminal 120 may determine search channels on the basis of a reference channel and the CA offset. The terminal 120 may configure the reference channel among at least one channel in which a cell exists. For example, a cell located on the reference channel may be the first CC 1120. The terminal 120 may configure, as the reference channel, a channel in which a cell is first found in frequency scanning for a scan beam. The terminal 120 may determine CA candidate channels by sequentially applying the CA offset first to the reference channel on the frequency band. The terminal 120 may sequentially determine CA candidate channels as search channels. The terminal 120 may determine whether there is a cell in the search channel. For example, the cell located on the channel to which the CA offset is applied may be the second CC 1130.

The terminal 120 may perform CA on the basis of beamforming. The terminal 120 may receive a signal transmitted on each of a plurality of CCs or transmit signals on a plurality of CCs during a beam instance in which beams are formed. A plurality of CCs may be provided from one BS to allow the terminal 120 to use the plurality of CCs when the terminal 120 forms beams or provided from mutually adjacent BSs to be covered by the beams. By considering beam directivity and capability of the terminal 120, the terminal 120 may identify all CCs related to the scan beam through frequency scanning. The terminal 120 may configure the scan beam (for example, the third beam 1113) and identify CA candidate channels on the basis of the CA offset. The terminal 120 may easily perform a cell search for each of the CA candidate channels for the scan beam by equally applying AGC for the scan beam to each of the CA candidate channels. The terminal 120 may acquire a CA channel list by determining whether there is a cell in each of the CA candidate channels. The terminal 120 may identify all CCs related to the scan beam from channels of the CA channel list. For example, the terminal 120 may identify the first CC 1120 and the second CC 1130.

The terminal 120 may identify CC combinations related to beams on the basis of CA information for each frequency and gain information for each beam. The terminal 120 may acquire a direction in which the BS for CA is located by performing AGC for the scan beam on the basis of gain information for each beam. Further, the terminal 120 may acquire information on cells (CCs) provided by the corresponding BS (or BS and adjacent BS) on the basis of CA information for each frequency. The terminal 120 may acquire CA information for each frequency and gain information for each beam so as to selectively configure the scan beam and the search channel and determine whether there is a cell without performing frequency scanning according to a combination of all beams and all channels. The terminal 120 may selectively configure the search channel related to the scan beam so as to secure a CA channel list within a shorter time than the case in which frequency scanning is performed for all combinations of the scan beams and the search channels.

Although FIG. 11 illustrates the example for operating the partial beam set for the beam-based frequency scanning, the disclosure is not limited thereto. The terminal 120 may decrease the time spent on frequency scanning by reducing a found frequency space through a CA offset when not only the partial beam set but also the full beam set is operated. Further, although FIG. 11 illustrated CA performed with one BS, the disclosure is not limited thereto. The terminal 120 may identify a CA channel by operating the same beams of the terminal 120 in spite of CCs provided at separate locations as well as CCs provided at the physically same location.

FIG. 12 is a flowchart illustrating an operation of frequency scanning for CA by a terminal in a wireless communication system according to an embodiment of the disclosure. FIG. 12 illustrates a method of operating the terminal 120.

Referring to FIG. 12, the terminal 120 may establish a reference channel in operation 1201. The reference channel may be a channel configured as a reference before a channel search for CA. The reference channel may be a channel in which a cell exists. The terminal 120 may make the reference channel correlate with a beam. The terminal 120 may establish the reference channel for each scan beam.

The terminal 120 may establish the reference channel in various ways. In some embodiments, the terminal 120 may establish the reference channel on the basis of the number of channels in which the same cell exists. When the same cell is detected in each of a predetermined number of search channels, the terminal 120 may establish one of the detected channels as the reference channel. For example, when the number is one, the terminal 120 may establish the search channel in which the cell exists as the reference channel. In another example, when the number is three, the terminal 120 may determine whether there is the cell in each of the search channels. The terminal 120 may acquire a cell ID of the corresponding cell by acquiring a synchronization sequence from each of the search channels. When the number of search channels having the same cell ID reaches three, the terminal 120 may establish one of the three search channels as the reference channel.

In some embodiments, the terminal 120 may establish the reference channel on the basis of a channel threshold value. When a channel quality of the signal received on the search channel exceeds a threshold value and there is the cell on the search channel, the terminal 120 may establish the search channel as the reference channel. For example, when an RSSI value of the search channel exceeds a channel threshold value and there is the cell on the corresponding search channel, the terminal 120 may establish the search channel as the reference channel.

In some embodiments, the terminal 120 may establish the reference channel on the basis of the number of candidate channels. The terminal 120 may establish search channels corresponding to the number of candidate channels. The terminal 120 may acquire a frequency scanning result for each of the search channels related to the scan beam. The terminal 120 may compare channel quality of respective search channels and establish the search channel having the highest channel quality as the reference channel.

In operation 1203, the terminal 120 may establish a CA candidate channel. The terminal 120 may configure candidate channels for CA through the established reference channel and the CA offset. The terminal 120 may configure candidate channels for CA related to the scan beam. The terminal 120 may search each of the candidate channels for CA rather than searching for each of the channels corresponding to all frequency bands. The terminal 120 may determine CA candidate channels in which the cell exists by changing the CA candidate channels to be sequentially searched for every cycle.

In operation 1205, the terminal 120 may determine whether there is a cell. The terminal 120 may determine whether there is the cell on the CA candidate channels. The terminal 120 may receive a signal transmitted on the CA candidate channel on the basis of AGC for the scan beam and measure the received signal. The terminal 120 may determine whether there is the cell on the established CA candidate channel based on at least one of the received signal and the channel quality of the signal according to measurement. Various embodiments related to whether there is the cell of the CA candidate channel, that is, determination about the presence or absence of the cell have been described with reference to FIG. 9. When it is determined that there is the cell on the CA candidate channel, the terminal 120 may perform operation 1207. When it is determined that there is no cell on the CA candidate channel, the terminal 120 may perform operation 1209.

The terminal 120 cannot update a CA channel list in operation 1207. The CA channel list may include channels in which the actual cell exists among CA candidate channels. Since there is the cell on the currently established search channel, the terminal 120 may update the CA channel list.

In operation 1209, the terminal 120 may determine whether it is determined whether there is the cell in all the CA candidate channels. When the determination of whether there is the cell is performed for all the CA candidate channels, the terminal 120 may end the frequency scanning procedure. When there is a search channel for which the determination of whether there is the cell is not performed among the CA candidate channels, the terminal 120 may perform operation 1203 again.

According to various embodiments, through the beam-based frequency scanning in CA, a CA configuration time related to the scan beam may be shorter than a CA configuration time related to another beam. The configuration time may be a time point at which data is transmitted and received using CA from the CA configuration time point. As the configuration time is shorter, implementation of the beam-based frequency scanning according to the disclosure may be identified.

According to various embodiments, through the beam-based frequency scanning in CA, the number of search channels for each beam among the channels in the channel list may decrease. The terminal may search for only CA candidate channels on the basis of the CA offset instead of searching for all channels for the scan beam, so that the number of search channels related to the scan beam in the channel list may decrease. Due to the decrease in the channels in the channel list, implementation of the beam-based frequency scanning may be identified.

In the disclosure, although the term "larger than or equal to (or larger than)" or "equal to or smaller than (or smaller than)" has been used to determine whether a particular condition is fulfilled, this is only for an example and does not exclude the term "larger than (or larger than or equal to)" or "smaller than (or equal to or smaller than)" For example, the condition "larger than or equal to" may be replaced with the condition "larger than", the condition "equal to or smaller than" may be replaced with the condition "smaller than", the condition "larger than" may be replaced with the condition "larger than or equal to", the condition "smaller than" may be replaced with the condition "equal to or smaller than", the condition "larger than or equal to and smaller than" may be replaced with "larger than and equal to or smaller than", and the condition "larger than and equal to or smaller than" may be replaced with the condition "larger than or equal to and smaller than".

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable ROM (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    performing frequency scanning for searching a cell on at least one frequency channel based on each of beams included in a first beam set of the terminal;
    establishing a connection with at least one cell identified based on the frequency scanning; and
    communicating with the at least one identified cell through a second beam set,
    wherein the beams of the first beam set is a subset of beams of the second beam set.

2. The method of claim 1, wherein the performing of the frequency scanning comprises:
    acquiring a channel list including the at least one frequency channel in which a cell is detected among a plurality of channels for the each of the beams in the first beam set.

3. The method of claim 1,
    wherein a number of the first beam set is adaptively configured based on an operation mode, and
    wherein the operation mode is determined based on at least one of frequency scanning time or accuracy of the frequency scanning.

4. The method of claim 1,
    wherein a number of the first beam set is adaptively configured based on cell information including at least one of a location of a base station or frequency information.

5. The method of claim 1,
    wherein a number of the first beam set is adaptively configured based on at least one of a moving direction of the terminal or history information,
    wherein the history information including location information or frequency information.

6. The method of claim 1, further comprising:
    identifying at least one cell based on the frequency scanning,
    wherein the at least one cell is identified based on at least one of a channel quality, a peak value of a synchronization signal, or a decoding result of system information.

7. The method of claim 1, further comprising:
    reconfiguring the first beam set, if any cell is not identified by the frequency scanning; and
    performing a complementary frequency scanning based on the reconfigured first beam set.

8. The method of claim 7,
    wherein the reconfigured first beam set includes more beams than the first beam set.

9. The method of claim 7,
    wherein a beam width of beams of the reconfigured first beam set are narrower than the beams of the first beam set.

10. The method of claim 1, wherein the performing of the frequency scanning comprises:
    determining a reference channel in which a cell exists among a plurality of channels for a beam of the first beam set,
    determining carrier aggregation (CA) candidate channels related to the beam among the plurality of channels based on the reference channel and an offset between carriers, and
    acquiring a CA channel list including channels in which a cell exists among the CA candidate channels by searching for the CA candidate channels.

11. An apparatus of a terminal in a wireless communication system, the apparatus comprising:
    at least one transceiver; and
    at least one processor;
    wherein the at least one processor is configured to:
        perform frequency scanning for searching a cell on at least one frequency channel based on each of beams included in a first beam set of the terminal;
        establish a connection with at least one cell identified based on the frequency scanning; and
        communicate with the at least one identified cell through a second beam set,
    wherein the beams of the first beam set is a subset of beams of the second beam set.

12. The apparatus of claim 11, wherein the at least one processor is further configured to:
    acquire a channel list including the at least one frequency channel in which a cell is detected among a plurality of channels for the each of the beams in the first beam set.

13. The apparatus of claim 11,
    wherein a number of the first beam set is adaptively configured based on an operation mode, and
    wherein the operation mode is determined based on at least one of frequency scanning time or accuracy of the frequency scanning.

14. The apparatus of claim 11,
    wherein a number of the first beam set is adaptively configured based on cell information including at least one of a location of a base station or frequency information.

15. The apparatus of claim 11,
    wherein a number of the first beam set is adaptively configured based on at least one of a moving direction of the terminal or history information,
    wherein the history information including location information or frequency information.

16. The apparatus of claim 11, wherein the at least one processor is further configured to:
    identify at least one cell based on the frequency scanning,
    wherein the at least one cell is identified based on at least one of a channel quality, a peak value of a synchronization signal, or a decoding result of system information.

17. The apparatus of claim 11, wherein the at least one processor is further configured to:
    reconfigure the first beam set, if any cell is not identified by the frequency scanning; and
    perform a complementary frequency scanning based on the reconfigured first beam set.

18. The apparatus of claim 17,
    wherein the reconfigured first beam set includes more beams than the first beam set.

19. The apparatus of claim 17,
    wherein a beam width of beams of the reconfigured first beam set are narrower than the beams of the first beam set.

20. The apparatus of claim 11, wherein the at least one processor is further configured to:
    determine a reference channel in which a cell exists among a plurality of channels for a beam of the first beam set,
    determine carrier aggregation (CA) candidate channels related to the beam among the plurality of channels based on the reference channel and an offset between carriers, and acquire a CA channel list including channels in which a cell exists among the CA candidate channels by searching for the CA candidate channels.

* * * * *